(12) United States Patent
Irie et al.

(10) Patent No.: US 7,159,102 B2
(45) Date of Patent: Jan. 2, 2007

(54) BRANCH CONTROL MEMORY

(75) Inventors: Naohiko Irie, Santa Clara, CA (US); Tony Lee Werner, Santa Clara, CA (US)

(73) Assignee: Renesas Technology Corp., Tokyo (JP)

( * ) Notice: Subject to any disclaimer, the term of this patent is extended or adjusted under 35 U.S.C. 154(b) by 353 days.

(21) Appl. No.: 10/869,760

(22) Filed: Jun. 15, 2004

(65) Prior Publication Data

US 2004/0225871 A1 Nov. 11, 2004

Related U.S. Application Data

(62) Division of application No. 09/410,682, filed on Oct. 1, 1999, now Pat. No. 6,772,325.

(51) Int. Cl.
*G06F 9/38* (2006.01)

(52) U.S. Cl. .................. 712/240; 712/238; 712/239

(58) Field of Classification Search ........... 712/238, 712/239, 240; 711/137
See application file for complete search history.

(56) References Cited

U.S. PATENT DOCUMENTS

| | | | |
|---|---|---|---|
| 3,573,854 A | 4/1971 | Watson et al. | |
| 3,940,741 A | 2/1976 | Horikoshi et al. | |
| 4,332,010 A | 5/1982 | Messina et al. | |
| 4,400,770 A | 8/1983 | Chan et al. | |
| 4,719,570 A | 1/1988 | Kawabe | |
| 4,724,517 A | 2/1988 | May | |
| 4,725,947 A | 2/1988 | Shonai | |
| 4,763,245 A | 8/1988 | Emma et al. | |
| 4,797,814 A | 1/1989 | Brenza | |
| 4,814,981 A | 3/1989 | Rubinfeld | |
| 4,868,742 A | 9/1989 | Gant et al. | |
| 4,873,629 A | 10/1989 | Harris et al. | |
| 4,926,317 A | 5/1990 | Wallach et al. | |
| 5,148,538 A | 9/1992 | Celtruda et al. | |
| 5,251,311 A | 10/1993 | Kasai | |
| 5,386,565 A | 1/1995 | Tanaka et al. | |
| 5,423,050 A | 6/1995 | Taylor et al. | |
| 5,434,804 A | 7/1995 | Bock et al. | |
| 5,440,705 A | 8/1995 | Wang et al. | |
| 5,448,576 A | 9/1995 | Russell | |
| 5,452,432 A | 9/1995 | Macachor | |
| 5,455,936 A | 10/1995 | Maemura | |
| 5,479,652 A | 12/1995 | Dreyer et al. | |
| 5,483,518 A | 1/1996 | Whetsel | |
| 5,488,688 A | 1/1996 | Gonzales et al. | |
| 5,530,965 A | 6/1996 | Kawasaki et al. | |

(Continued)

FOREIGN PATENT DOCUMENTS

EP 0652516 A1 5/1995

(Continued)

OTHER PUBLICATIONS

Advanced RISC Machines Ltd., "An Introduction to Thumb," Mar. 1995, pp. 1-26.

(Continued)

*Primary Examiner*—William M. Treat
(74) *Attorney, Agent, or Firm*—J. Nicholas Gross; Loudermilk & Associates

(57) ABSTRACT

A branch control memory store branch instructions which are adapted for optimizing performance of programs run on electronic processors. Flexible instruction parameter fields permit a variety of new branch control and branch instruction implementations best suited for a particular computing environment. These instructions also have separate prediction bits, which are used to optimize loading of target instruction buffers in advance of program execution, so that a pipeline within the processor achieves superior performance during actual program execution.

7 Claims, 19 Drawing Sheets

U.S. PATENT DOCUMENTS

| | | |
|---|---|---|
| 5,570,375 A | 10/1996 | Tsai et al. |
| 5,590,354 A | 12/1996 | Klapproth et al. |
| 5,596,734 A | 1/1997 | Ferra |
| 5,598,551 A | 1/1997 | Barajas et al. |
| 5,608,881 A | 3/1997 | Masumura et al. |
| 5,613,153 A | 3/1997 | Arimilli et al. |
| 5,615,386 A | 3/1997 | Amerson et al. |
| 5,623,626 A | 4/1997 | Morioka et al. |
| 5,627,842 A | 5/1997 | Brown et al. |
| 5,657,273 A | 8/1997 | Ayukawa et al. |
| 5,682,545 A | 10/1997 | Kawasaki et al. |
| 5,701,449 A | 12/1997 | Matsuo et al. |
| 5,704,034 A | 12/1997 | Circello |
| 5,708,773 A | 1/1998 | Jeppesen, III et al. |
| 5,724,549 A | 3/1998 | Selgas et al. |
| 5,737,516 A | 4/1998 | Circello et al. |
| 5,742,617 A | 4/1998 | Warren |
| 5,742,804 A | 4/1998 | Yeh et al. |
| 5,751,621 A | 5/1998 | Arakawa |
| 5,768,152 A | 6/1998 | Battaline et al. |
| 5,771,240 A | 6/1998 | Tobin et al. |
| 5,774,701 A | 6/1998 | Matsui et al. |
| 5,778,237 A | 7/1998 | Yamamoto et al. |
| 5,781,558 A | 7/1998 | Inglis et al. |
| 5,794,027 A | 8/1998 | Grohoski et al. |
| 5,796,978 A | 8/1998 | Yoshioka et al. |
| 5,822,619 A | 10/1998 | Sidwell |
| 5,828,825 A | 10/1998 | Eskandari et al. |
| 5,832,248 A | 11/1998 | Kishi et al. |
| 5,835,963 A | 11/1998 | Yoshioka et al. |
| 5,848,247 A | 12/1998 | Matsui et al. |
| 5,859,789 A | 1/1999 | Sidwell |
| 5,860,127 A | 1/1999 | Shimazaki et al. |
| 5,862,387 A | 1/1999 | Songer et al. |
| 5,867,726 A | 2/1999 | Ohsuga et al. |
| 5,875,355 A | 2/1999 | Sidwell et al. |
| 5,884,092 A | 3/1999 | Kiuchi et al. |
| 5,896,550 A | 4/1999 | Wehunt et al. |
| 5,907,867 A | 5/1999 | Shinbo et al. |
| 5,918,045 A | 6/1999 | Nishii et al. |
| 5,930,523 A | 7/1999 | Kawasaki et al. |
| 5,930,833 A | 7/1999 | Yoshioka et al. |
| 5,943,498 A | 8/1999 | Yano et al. |
| 5,944,841 A | 8/1999 | Christie |
| 5,950,012 A | 9/1999 | Shiell et al. |
| 5,953,538 A | 9/1999 | Duncan et al. |
| 5,956,477 A | 9/1999 | Ranson et al. |
| 5,961,637 A | 10/1999 | Sturges et al. |
| 5,978,874 A | 11/1999 | Singhal et al. |
| 5,978,902 A | 11/1999 | Mann |
| 5,983,017 A | 11/1999 | Kemp et al. |
| 5,983,379 A | 11/1999 | Warren |
| 6,023,757 A | 2/2000 | Nishimoto et al. |
| 6,038,582 A | 3/2000 | Arakawa et al. |
| 6,038,661 A | 3/2000 | Yoshioka et al. |
| 6,091,629 A | 7/2000 | Osada et al. |
| 6,092,172 A | 7/2000 | Nishimoto et al. |
| 6,108,777 A | 8/2000 | Puziol et al. |
| 6,119,222 A * | 9/2000 | Shiell et al. ................ 712/238 |
| 6,351,790 B1 | 2/2002 | Jones |
| 6,374,348 B1 | 4/2002 | Irie et al. |
| 6,389,531 B1 | 5/2002 | Irle et al. |
| 6,415,344 B1 | 7/2002 | Jones et al. |
| 6,425,075 B1 | 7/2002 | Stiles et al. |
| 2002/0116599 A1 | 8/2002 | Kainaga et al. |

FOREIGN PATENT DOCUMENTS

| | | |
|---|---|---|
| EP | 0933926 A1 | 8/1999 |
| JP | 9602819 | 9/1996 |

OTHER PUBLICATIONS

Cragon, Harvey G., "Branch Strategy Taxonomy and Performance Models," (Los Alamitos, CA : IEEE Computer Society Press, c1992), pp. 13-77; 87-97.

Farrens, et al., "Implementation of the PIPE Processor," Journal: Computer vol. 24, No. 1, Jan. 1991, pp. 65-70.

INMOS Ltd, "Transputer Instruction Set," 1988.

Kissell, "MIPS$_{16}$ : High-density MIPS for the Embedded Market," RTS '97: Real Time Systems and Embedded Applications, 1997, pp. 559-571.

Lefurgy et al., "Improving Code Density Using Compression Techniques," believed to be published in: Proceedings of the Thirtieth Annual IEEE/ACM International Symposium on Microarchitecture, Dec. 1997, pp. 194-203.

Patterson, et al., Computer Architecture: A Quantitative Approach, 2nd ed. (San Francisco : Morgan Kaufmann Publishers, c1996), pp. 262-278.

Richard York, "Real Time Debug for System-on-Chip Devices," Jun. 1999, pp. 1-6.

Young, et al., "A Simulation Study of Architectural Data Queues and Prepare-to-Branch Instruction," IEEE International Conference on Computer Design: VLSI in Computers, Oct. 11, 1984, pp. 544-549.

* cited by examiner

Pipeline Stage Clocking

| Branch Type | Prediction | Actual Branch Dir | 2 Target Instrs in IAR.T | 1 Target Instr in IAR.T | 0 Target Instr in IAR.T | Target Addr not Ready |
|---|---|---|---|---|---|---|
| unconditional | " | " | 0 | 1 | 2 | 3 |
| conditional | taken (hit) | taken | 0 | 1 | 2 | 3 |
| conditional | not-taken (hit) | not-taken | 0 | | | 1 |
| conditional | taken (miss) | not-taken | 2 | | | 3 |
| conditional | not-taken (miss) | taken | 2 | 3 | 4 | 5 |

|  |  |  |  |  |  |  |  |  |  |  |
|---|---|---|---|---|---|---|---|---|---|---|
| pta | F | P | D | E1 | E2 | E3 | W | | | penalty = 2 |
| br | | | ... | D | E1 | E2 | E3 | W | | |
| target | | | | | F | P | | | | |
| fall-through (from ib) | | | | | | | D | E1 | E2 | E3 | W |

FIG. 2I

| | | | | | | | | | | | |
|---|---|---|---|---|---|---|---|---|---|---|---|
| br | F | P | D | E1 | E2 | E3 | W | | | | penalty = 2 |
| fall-through (from ib) | | | | D | ... | ... | ... | ... | | | |
| fall-through +4 | | | | D | ... | ... | ... | ... | | | |
| target (from IAR) | | | | | D | E1 | E2 | E3 | W | | |
| target+4 (from IAR) | | | | | | D | E1 | E2 | E3 | W | |
| target+8 | | | | | | F | P | D | E1 | E2 | E3 | W | target+8 supplied from IAR.IA (a) 2 target instructions are ready in IAR.T

| | | | | | | | | | | | |
|---|---|---|---|---|---|---|---|---|---|---|---|
| br | F | P | D | E1 | E2 | E3 | W | | | | penalty = 3 |
| fall-through (from ib) | | | | D | ... | ... | ... | ... | | | |
| fall-through +4 | | | | D | ... | ... | ... | ... | | | |
| target (from IAR) | | | | | | D | E1 | E2 | E3 | W | |
| target+4 | | | | | | F | P | D | E1 | E2 | E3 | W | target+4 supplied from IAR.IA (b) 1 target instruction is ready in IAR.T

FIG. 2J

| Opcode | Rm/edisp | disp | L | R | IARn | res |
|---|---|---|---|---|---|---|
| 6 | 6 | 13 | 1 | 1 | 3 | 2 |

| Opcode | Rm/Pm | Rn/Pn/imm | res/imm | IARn | P | ext | res |
|---|---|---|---|---|---|---|---|
| 6 | 6 | 6 | 5 | 3 | 1 | 3 | 2 |

```
                PTB IAR4, BEGIN_LOOP
                PTB IAR5, INC
                ADD Ri, R{63}, Ri    // R{63} = 0
                ADD Rx, Rx, #100     // Loop Count
BEGIN_LOOP:
                LD Ra, PTR_A
                ADD PTR_A, PTR_A, #4
                AND Ry, Ra, #1
                BR, EQ RY, IAR5
                ADD Ra, Ra, #1
                ST Ra, PTR_A
INC:
                ADD Ri, Ri, #1
                CMP.LT P4, IAR4
                BR.NEP P4, IAR4      // Branch to BEGIN_LOOP
```

FIG. 4C

BRANCH CONTROL MEMORY

CROSS REFERENCE TO RELATED APPLICATIONS

The present application claims priority to and is a divisional application of Ser. No. 09/410,682 filed Oct. 1, 1999 now U.S. Pat. No. 6,772,325 assigned to the present assignee, which latter application is hereby incorporated by reference as if fully set forth herein.

FIELD OF THE INVENTION

The present invention relates generally to the field of high performance computing systems, and methods for improving instruction execution. The invention is particularly useful for reducing branch instruction delays in highly pipelined processors.

BACKGROUND OF THE INVENTION

Many modern computing systems utilize a processor having a pipelined architecture to increase instruction throughput. In theory, pipelined processors can execute one instruction per machine cycle when an well-ordered, sequential instruction stream is being executed. This is accomplished even though the instruction itself may implicate or require a number of separate micro-instructions to be effectuated. Pipelined processors operate by breaking up the execution of an instruction into several stages that each require one machine cycle to complete. For example, in a typical system, an instruction could require many machine cycles to complete (fetch, decode, ALU operations, etc.) Latency is reduced in pipelined processors by initiating the processing of a second instruction before the actual execution of the first instruction is completed. In the above example, in fact, multiple instructions can be in various stages of processing at any given time. Thus, the overall instruction execution latency of the system (which, in general, can be thought of as the delay between the time a sequence of instructions is initiated, and the time it is finished executing) can be significantly reduced.

The above architecture works well when program execution follows a sequential flow path. In other words, this model is premised on a sequential model of program execution, where each instruction in a program is usually the one immediately in memory following the one just executed. A critical requirement and feature of programs, however, is the ability to "branch" or re-direct program execution flow to another set of instructions; using branch instructions conditional transfer of control can be made to some other path in the executing program different from the current one. However, this path may or may not coincide with the next immediate set of instructions following the instruction that was just executed.

In general, prior art processors have a single address register for instructions that are to be executed, including a branch target address. The branch target address is an address indicating the destination address of the branch instruction. The branch instruction is executed quickly by the processor if the correct target address for the branch instruction is already stored in the address register. However, branch instructions can occur arbitrarily within any particular program, and it is not possible to predict with certainty ahead of time whether program flow will be re-directed. Various techniques are known in the art for guessing about the outcome of a branch instruction, so that, if flow is to be directed to another set of instructions, the correct target address can be pre-calculated, and a corresponding set of instructions can be prefetched and loaded in advance from memory to reduce memory access latencies. In general, since memory accesses are effectuated much slower than pipeline operations, execution can be delayed pending retrieval of the next instruction.

Sometimes, however, the guess about the branch outcome is incorrect, and this can cause a "bubble", or a pipeline stall. A bubble or stall occurs, in general, when the pipeline contains instructions that do not represent the desired program flow (i.e., such as from an incorrectly predicted branch outcome). A significant time penalty is thus incurred from having to squash the erroneous instruction, flush the pipeline and re-load it with the correct instruction sequence. Depending on the size of the pipeline, this penalty can be quite large; to a significant degree, therefore, the desire for long pipeline designs (to increase effective instruction throughput) is counterbalanced by the stall penalty that occurs when such pipeline has to be flushed and re-loaded. Thus, significant effort has been expended in researching, designing and implementing intelligent mechanisms for reducing branch instruction latency.

To analyze branch instruction latency, it is helpful to think of a branch instruction as consisting of three operational steps:
(1) deciding the branch outcome
(2) calculating the branch target address (i.e., the location of the instruction that needs to be loaded)
(3) transferring control so that the correct instruction is executed next In most systems, steps (1) and (2) must be resolved in this order by a branch instruction. Branch instructions also fall generally into two classes: conditional, and unconditional. When the branch is always taken it is referred to as an unconditional branch, and the above three operational steps are not required. A conditional branch is taken depending on the result of step (1) above. If the branch is not taken, the next sequential instruction is fetched and executed. If the branch is taken, the branch target address is calculated at step (2), and then control is transferred to such path at step (3). A good description of the state of the art in branch prediction can be found generally in section 4.3 of a textbook entitled Computer Architecture: A Quantitative Approach, $2^{nd}$ edition, by *Patterson and Hennessy*; pages 262–278 are incorporated by reference herein.

In general, the number of penalty cycles associated with a branch instruction can be broken down into two categories: (1) fetch latency of the target instruction from decode of branch; this generally refers to the time required to fetch and place the target instruction of the branch into the pipeline after it has been identified; (2) latency of the branch condition generation; this refers generally to the process by which it is determined if the branch is actually taken or not-taken. Within a particular system it is usually more important to reduce category (1) penalties since they affect both conditional and unconditional branches, while the category (2) penalties are only associated with conditional branches. Moreover, category (2) penalties can be ameliorated to some extent by well-known techniques, including branch prediction. For example, in U.S. Pat. No. 5,742,804 to *Yeh et. al.*, also incorporated by reference herein, a compiler inserts a "branch prediction instruction" sometime before an actual branch instruction. This prediction instruction also specifies the target address of the branch, to further save execution time. Instructions are pre-fetched in accordance with the hint provided by the prediction instruction, so that they will be ready for execution when control is transferred. The prediction itself on the branch outcome is made based on information acquired by the compiler at run time. There does not seem to be very optimal handling of mis-predictions in Yeh, however, and these "misses" can be costly from a branch penalty perspective. Accordingly, the approach shown there also appears to have serious limitations.

Looking more specifically at the breakdown of the category (1) time penalty within a particular pipelined computing system, it can be seen to consist of the following: reading the branch operand (0 to 1 cycles); calculating the branch target address (1–2 cycles); and accessing the instruction cache and putting the target instruction into the decode stage of the pipeline (1–2 cycles). Thus, in a worst case scenario, a branch instruction latency of 5 cycles can be incurred. In some types of programs where branch instructions are executed with some regularity (i.e., 20% of the time) it is apparent that the average branch instruction penalty can be quite high (an average of 1 cycle per instruction).

Various mechanisms have been proposed for minimizing the actual execution time latency for branch instructions. For instance, one approach used in the prior art is to compute the branch address while the branch instruction is decoded. This can reduce the average branch instruction cycle, but comes at the cost of an additional address adder; this consumes area and power that is preferably used for other functions.

Another approach used in the prior art consists of a target instruction history buffer. An example of this is shown in U.S. Pat. Nos. 4,725,947, 4,763,245 and 5,794,027 incorporated by reference. In this type of system, each target instruction entry in a history buffer is associated with a program counter of a branch instruction executed in the past. When a branch is executed, an entry is filled by the appropriate target instruction. The next time when the branch is in the decoding stage, the branch target instruction can be prepared by matching the program counter to such entry in the history buffer. To increase the useful hit ratio of this approach, a large number of entries must be kept around, and for a long time. This, too, requires an undesirable amount of silicon area and power. Moreover, the matching mechanism itself can be a potential source of delay if there are a larger number of entries to compare against.

Yet another approach is discussed in the following: (1) an article tided "Implementation of the PIPE Processor by *Farrens and Pleszkun* on pages 65–70 of the January 1991 edition of the journal Computer; and (2) an article tided "A Simulation Study of Architectural Data Queues and Prepare-T0-Branch Instruction," by Young and Goodman on pages 544–549 of the October 1984 IEEE International Conference on Computer Design: VLSI in Computers, both of which are hereby incorporated by reference. In the scheme described in these references, a form of delayed branch is proposed by using a prepare-to-branch (PTB) instruction. The PTB instruction is inserted before the branch instruction, decides the branch outcome, and then specifies a delay before transfer of control. By ensuring that the delay is sufficiently large to guarantee the branch condition will have been evaluated when the instruction is completed, the pipeline is kept full. A problem with this approach, however, lies in the fact that the latency caused by the target address calculation (step 2) cannot be entirely accommodated, because it can be quite large. U.S. Pat. No. 5,615,386 to Amerson et. al., also incorporated by reference herein, also specifies the use of a PTB instruction. This reference also mentions that branch execution can be improved by separating the target address calculation (step (2)) from the comparison operation (step (1)). By computing the branch address out of order, latencies associated with branches can be further reduced. This reference discusses a number of common approaches, but is limited by the fact that: (1) It does not use a folded compare approach; thus separate compare and branch instructions are required, and this increases code size, dynamic execution time, etc; (2) the compare result must be recognized by way of an internal flag, instead of a register, and this reduces flexibility; (3) without using a register, such as a link register, execution of function subroutines is more challenging because it is more difficult to save/switch contexts; (4) the disclosure also relies on a kind of complex nomination process, whereby the execution of a loop effects the prediction weighting for a subsequent related loop.

A related problem in the art arises from the fact that there are often multiple branches included in the program flow. In such case, it is necessary to update the target address in the address register for each branch instruction. This updating requires additional time and thus slows down program execution.

SUMMARY OF THE INVENTION

Accordingly, a general object of the present invention is to overcome as many of the aforementioned disadvantages associated with prior art techniques in this field as possible.

Another object of the present invention is to provide an improved branch operation instruction format that is both powerful and flexibly implemented by pipelined processors, so that program designers will have a variety of implementation tools available for composing software programs.

A related object of the present invention is to provide an improved branch operation consisting of separate control and branch instructions, so that access latencies within a pipelined processor can be reduced and/or eliminated in many instances.

Still another related object is to provide new types of branch instructions which combine multiple instructions, such as compare and branch operations, so that code size can be reduced, and execution speed increased.

Yet another object is to provide new types of branch instructions which support advanced comparison logic operations, including register to register comparisons, to increase programming flexibility.

A further related object is to implement such separate control and branch instructions with two distinct prediction and/or target loading parameters in order to improve an overall hit rate for branch target instruction availability.

Another object of the present invention is to provide an improved computing system for executing the aforementioned branch control/branch instructions in the form of a pipelined processor, so that overall program branch operations can be handled faster and with less latency.

Still another object is to provide a processor with a pipeline architecture that includes a number of loadable and architecturally visible branch target address registers, so that instructions for multiple program branches can be easily and quickly loaded and made ready for execution.

A similar object is to provide a processor with a pipeline architecture that includes a number of loadable branch target instruction registers storing target instructions corresponding to the branch target addresses, so that instructions for multiple program branches can be quickly accessed by the pipeline.

Another object is to provide a processor that can efficiently execute branch instructions from two different instruction sets, in order to simultaneously support legacy software using basic branch instruction formatting, as well as enhanced software using an improved branch instruction as described herein.

Yet a further object is to provide an intelligent preloading circuit within a computing system, for ensuring that necessary instructions are available for loading within a pipeline as they are needed.

A related object is to provide that such preloading circuit can use a prioritized scheme for determining which instructions are more likely to be needed than others.

Among other objects of the present invention is to provide an exception handling mechanism that is well suited to the improved processor and instruction architectures mentioned above, and which reduces system complexity.

One aspect of the present invention, therefore, relates to an improved machine executable branch control instruction for facilitating operation of a program branch instruction within a computing machine. The control instruction generally includes a first portion (R bit) for specifying whether the program branch includes a first type branch instruction (such as PC based branch) or a second type branch instruction (such as a register based branch). A second portion (disp+edisp) of the control instruction is associated with a target address for the program branch instruction. A third portion (IARn) specifies a target address register for storing the target address. During execution, the control instruction causes the computing machine to compute the target address before the program branch instruction is even executed. The branch control instruction is configured such that a variable amount of the second portion (either edisp, or disp+edisp) is used by the computing machine to compute the target address, because a direct type of address calculation based on the PC will take more (up to 19 bits) than a register based address calculation (6 bits) to take place. The type of addressing is specified in the branch control instruction by a setting in first portion of the control instruction.

Other features of this aspect of the invention include the fact that a fourth portion (L bit) of the control instruction has a prediction value specifying the likelihood of the branch target instruction being used as part of the program for at least one branch operation. This speculative prediction is derived in a different manner than conventional "hint" bits, since it examines the macro behavior of a number of related program branches, and not just one in isolation. This yields better instruction loading, since the aggregate behavior of the program can be considered.

In general, the branch control instruction can be associated with two or more separate program branch instructions, thus reducing code size, improving target instruction loading, etc. Through branch analysis, a number of target addresses can be computed and made available because of such branch control instructions before the computing machine even executes any of the actual program branch instructions.

Another aspect of the present invention covers an improved branch instruction that is related to and follows the aforementioned branch control instruction within a program instruction stream, so that the necessary parameters for the former are already set up by the latter in advance within a computing machine pipeline. The branch instruction has a folded or combined format, thus combining both a compare and a branch operation into one for faster execution, simpler implementation, etc. A first portion of the branch contains branch parameters for performing a branch determination (i.e., such as register identifiers Rm, Rn, and/or operation extensions—BNE, etc.) to decide whether the program branch should be taken or not taken by the computing machine. A second portion (IARn) contains branch target address information used by the computing machine for performing re-direction of instruction execution flow to a branch target address when the program branch is taken. With this format, the branch determination and re-direction of instruction execution flow associated with the branch instruction can be resolved at the same time within the computing machine. Again, the branch instruction operates in conjunction with the aforementioned branch control instruction, so that a branch target address is computed in advance of the branch determination and re-direction of instruction execution flow.

Preferably, one or more branch target address registers are used, and the branch instruction can point to any one of them for the branch target address determination. In one embodiment, the first portion is taken up by two register specifier fields (Rm, Rn), so that arithmetic/logical operations involving such registers can be evaluated as part of the comparison process. In addition, logical operations using predicate operands can also be specified as part of the compare operation, so that, for example, a branch can be taken if either a variable A or a variable B identified in the first portion are logically true, or if both are true, etc.

Another aspect of the present inventions relates to a computer program that incorporates the aforementioned branch control and branch instructions. Such programs can be executed so as to optimize speed and latency characteristics of processor pipeline architectures that ate set up to take advantage of the field formats for such instructions. In particular, program branch targets can be configured with a priority value ranging from 1 to n, where n>2, so that a relative fetching priority of target instructions can be configured witin the processor pipeline as well. The priority value can be set by the choice of which branch target address register (i.e., from 0 to 7) is used to store the branch target address.

A processor that executes the above branch control and branch instructions embodies another of the aspects of of the present invention. This processor generally includes a plurality of target address registers, an instruction decoder for decoding an instruction supplied thereto and providing control signals according to results of such decoding, and an an execution unit responsive to the control signals and executing said instruction. As alluded to earlier, the branch control instruction serves as a flag or indicator to the processor that a branch instruction will follow later in the instruction stream. Thus, the branch control instruction has its own operation code field defining a branch control operation, along with an address field used for calculating an address for a branch, and a first register selection for specifying one of the plurality of target address registers to store the branch address after it is calculated. The branch instruction which follows includes an operation code field defining a branch operation (as well as a compare operation preferably), and a second register selection field for specifying one of the plurality of address registers that stores the address to be used for the branch operation. Thus, when the branch instruction is executed, the branch control instruction has already caused the branch target address to be calculated so that it is available to the branch instruction for re-direction of instruction flow if necessary.

The branch address can be calculated in a number of different fashions. For example, a displacement relative to a program counter (PC). In such cases, an address field of the branch control instruction further includes a field for immediate data, so that the branch address is calculated by adding the immediate data to contents of said program counter. In another variation, data contained in any one of a plurality of general purpose registers can be specified as the source of the branch address information and then stored in one of the branch target address register. These two variations can also be combined if desired.

In a preferred embodiment, both the branch control and branch instruction include bit fields for separate forms of prediction/speculation, in separate bit fields. These are used for complementary purposes, and help to improve target instruction preloading performance. By evaluating these two different kinds of prediction parameters, speculative pre-loads, pre-fetches, etc., can be tailored for a particular architecture.

In another variation, the processor can execute branch instructions having different lengths (such as 16 bits and 32 bits), so that two different modes of operation can be supported if need be.

The preferred embodiment of the processor further includes an exception handling circuit that operates in conjunction with the branch control instruction, so that an exception check on the calculated branch target address occurs prior to storing the branch target address in one of the plurality of branch target address registers. In this fashion, software errors can be caught early in the instruction stream to simplify debugging. Additionally, a savings in logic is realized in connection with the branch address buffer from not having to check for potential erroneous address data.

A preferred method of operating a pipeline processor includes branch handling, target instruction loading and target instruction preloading as described above to improve latency handling, so that cache accesses can be essentially hidden from a latency perspective.

A random access multi-entry address buffer, and a related random access multi-entry target instruction buffer form another useful aspect of the present invention. Each of the address entries store an address calculated based on address fields contained in one or more of decoded branch control instructions. The target instruction buffer is loaded (or preloaded) based on such target addresses, so that during execution time, a plurality of branch target instructions are kept available in case a corresponding branch operation requires the same. In one embodiment, the number of address registers is greater than that of the instruction registers. For the preferred embodiment, each register in the instruction buffer contains two instructions, so as to optimize loadings from an associated cache. In another variation, the target instruction registers are loaded prior to any instructions being executed, if a configure instruction can determine such instructions and load the register accordingly.

A method of operating the aforementioned branch target address and branch target intruction buffers in the fashion described above constitutes another aspect of the present invention.

The branch target instruction buffer is preferably loaded under control of a prefetch controller, which represents yet another significant aspect of the present inventions. Generally speaking, the prefetch controller speculatively loads the branch target instruction buffer based on evaluating a priority of the target address entries in the branch target address buffer. In other words, during any particular cycle, the highest priority target address entry is considered for pre-loading; this means that it is possible that lower priority target address entries might not be considered if there is no cycle time available. The prefetch controller performs two kinds of preloading: active and passive. The former attempts to load target instructions even before a corresponding branch requires the same, while the latter makes sure that if a branch is detected, the instruction buffer is at least loaded to avoid latencies in any second iteration of the branch. The prefetch controller preferably includes a monitoring means for determining whether branch target instructions already in the instruction buffer might be invalid, as these are the ones most usefully replace with fresh target instructions. A selecting means selects a replacement branch target instruction when an invalid branch target instruction is found, by ranking a number of potential branch target addresses in the branch address register set. A loading means then replaces the invalid branch target instruction with the replacement branch target instruction by causing the instruction cache to over-write the former in the branch target instruction buffer.

In the preferred embodiment, the monitoring means includes an N bit register acting as a validity loading mask, and which is loaded in accordance with a validity status of N separate branch target instructions stored in an N entry branch target instruction buffer, such that each bit of N bit register identifies whether the corresponding entry in the branch target instruction buffer is valid or invalid. Further in a preferred approach, the selecting means includes a preload register mask, which register includes a bit identifying whether which if any storage locations holding the potential branch target addresses can be used for loading a replacement branch target instruction. In addition, a branch instruction hint register mask is also consulted, since it includes a bit for each entry in the branch target address buffer identifying whether a branch target instruction is likely to be needed.

A prefetch control buffer of the present invention includes the above validity, select and hint masks to serve a prefetch controller to optimize instruction loading in a pipelined processor.

The ranking of entries is performed by examining a storage location identification for each potential branch target address, such that branch target addresses can be prioritized in accordance with which storage location they are associated with. For example, branch target addresses in higher number registers of a branch target address buffer are considered before lower numbered registers (or vice versa depending on the logic employed.) The preloading operation, however, is logically configured so that it does not interfere with normal cache accesses used to keep an instruction buffer supplied with sequential instructions for the instruction stream.

In addition, to ensure a steady flow of instructions after a target instruction is preloaded into the target instruction buffer, an additional incremented target address buffer is used by the fetch controller. In this buffer, addresses for instructions following the replacement target instruction are stored, so that said incremented target addresses can be used for cache accesses if the replacement target instruction is actually executed later by the pipeline.

A method of maintaining a supply of instructions to a pipeline in a computing system in the present invention therefore includes the steps of: monitoring a status condition of any branch target instructions already available in the pipeline for execution; ranking a number of potential branch target addresses; selecting a new branch target instruction based on the status condition and said ranking; and then loading a highest ranked new branch target instruction based on said ranking of said potential branch target addresses, so that said highest ranked new branch instruction is available as needed for loading in the pipeline.

BRIEF DESCRIPTION OF THE DRAWINGS

FIG. 2C is a table summarizing the branch operation handling performance of the computing system of the present invention;

FIGS. 2D–2L provide detailed visual and temporal illustrations of the operation of the pipeline during various branch operations;

FIG. 4A depicts a preferred embodiment of a branch control instruction of the present invention;

FIG. 4B depicts a preferred embodiment of a conditional branch instruction of the present invention;

FIG. 4C illustrates a typical example of usage of the aforementioned branch control and branch instructions in a typical program that can be executed by the present computing system;

DETAILED DESCRIPTION OF THE INVENTION

Figure 1:
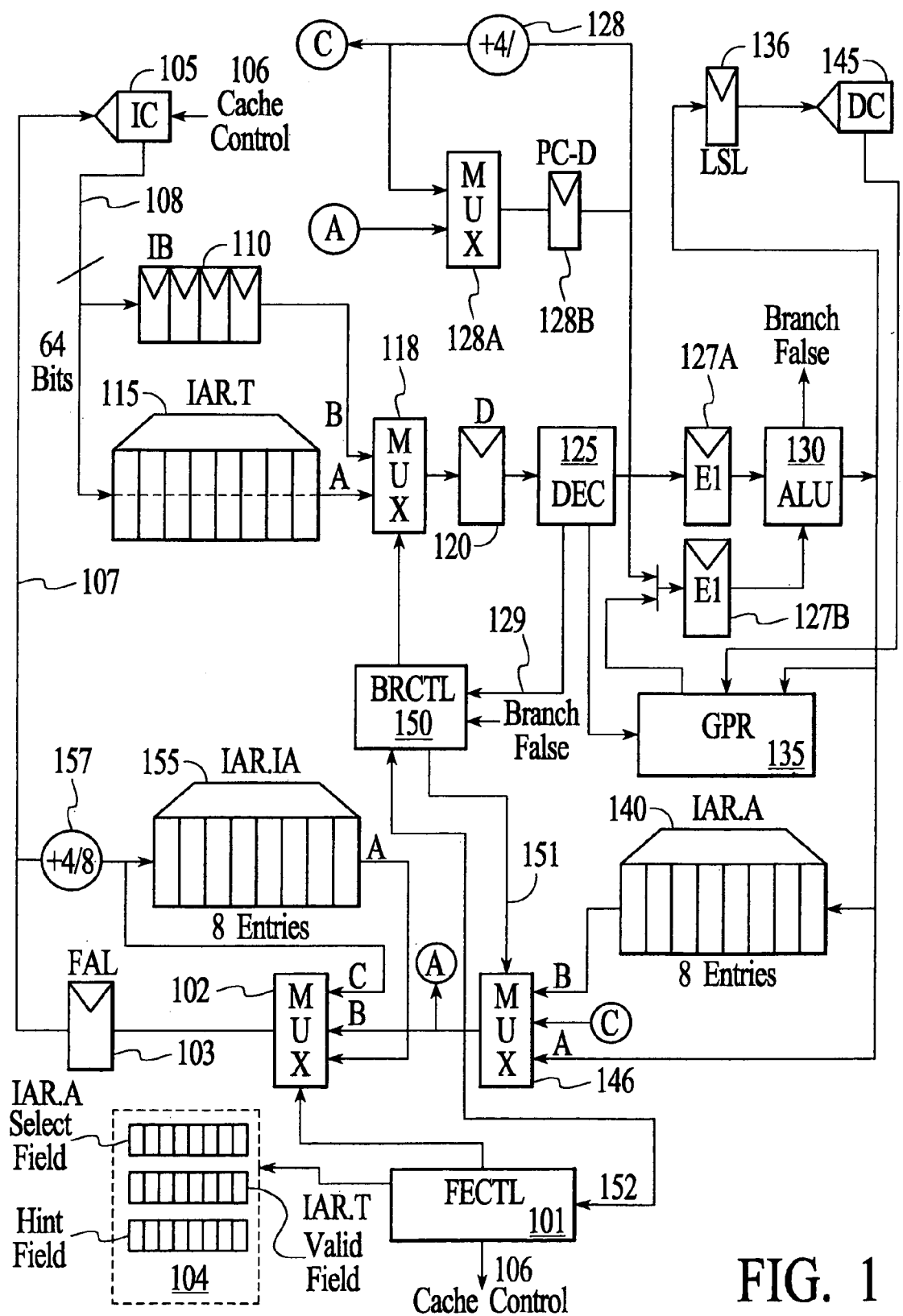
FIG. 1 is a block diagram illustrating a preferred embodiment of a computing system of the present invention.

FIG. 1 is a block diagram illustrating various aspects of the present invention, including an improved computing machine 100 that includes a pipelined processor having the following functional circuits.

First, a Fetch Controller (FECTL) 101 operates to control a fetch multiplexer/selector 102 and a onboard cache in a manner described in more detail below. This circuitry is involved in the first stage of the processor pipeline, which is responsible generally for fetching (and pre-fetching) instructions to ensure adequate instruction flow throughout the pipeline. As seen further in FIG. 1, an address for an instruction to be fetched is stored in a Fetch Instruction Address (FAL) latch 103; this is loaded in accordance with an output from a fetch mux 102 as explained below.

Assisting in fetch/prefetch operations is a hint bit buffer (HB) 104. In the preferred embodiment, HB includes three distinct control registers: (1) an instruction validity register configured so that each bit indicates a validity of a corresponding entry in an target instruction register set (see below); (2) a pre-load "mask" register, where each bit identifies the status of a hint/prediction bit for a corresponding one of the instruction address registers (see below); and (3) a select "mask" register, which indicates which of the target instruction registers is available for pre-loading. An instruction hint bit refers to a prediction, generated in advance by the compiler (or software program at run time) concerning whether a particular instruction is likely to be an actual target of a branch instruction when the latter is executed. Of course, other variations are possible, and may be more preferable for some applications of the present inventions.

The instruction(s) pointed to by Fetch Instruction Address latch (FAL) 103 are retrieved from an Instruction Cache (IC) and cache controller, generally designated IC 105, during a first phase (F1) of the first stage in the pipeline using control line 106. IC 105 can store a plurality of 32-bit width program instructions that can be executed by processor 100. In a preferred embodiment, the capacity of IC 105 is 32 KB, and a cache line size is 32 B. Such cache can be constructed, for example, as a 4 way set associative cache memory using structures, methods and techniques that are well known in this field. Other approaches may be more desirable depending on the intended performance and hardware characteristics of processor 100. Of course, in the event of a cache miss, a conventional memory access cycle using a bus interface unit (not shown) must be run to retrieve the needed instruction. IC 105 would then be updated in a conventional fashion as well.

Coupled by way of 64 bit instruction bus 108 to IC 105 is Instruction Buffer (IB) 110, which stores a plurality of sequential program instructions. In a preferred embodiment, IB 110 is loaded with two instructions each cycle from IC 105, and includes capacity for four separate entries (4 instructions of 32 bits each, generally identified as ib0, ib1, ib2, ib3 (not shown here)). This structure is loaded during the second phase (F2) of the first stage of a pipeline of processor 100. Thus, at any moment in time, the maximum latency associated with this stage (assuming this stage is empty and must be filled with a new set of instructions) is 2 cycles. Again, this approach for IB 110 is a compromise between an extremely deep and extremely shallow buffer, and the benefits of the present invention can be realized even if the specific implementation is varied slightly from environment to environment.

Also coupled to bus 108 is Instruction Address Register Target (IART) buffer 115. In contrast to IB 110, IART 115 stores target instructions that have been pre-loaded so that they are ready to be executed as the destination of branch instructions, as explained in further detail below. In a preferred embodiment, IART has 8 entries, with each entry storing 2 instructions. Again, other specific implementations can be used, and the present invention is by no means limited to such specific architectural constraints.

A multiplexer/selector circuit (MUX_D) 118 is a selector that, depending on various parameters described below (including whether a branch instruction has been previously decoded) couples an instruction output from either IB 110 (input A) or IART 115 (input B) and routes it to a Decode Instruction Buffer (D) 120. This buffer is also loaded during the second phase (F2) of the first stage of the pipeline. The instruction stored here in this latch corresponds to a program instruction that is in a subsequent "decoding stage" of the microprocessor pipeline. The operating logic for MUX_D 118 is as follows:

---

If (branch instruction)
    Select input A
Else
    Select input B

---

Program Counter register (PC-D) 128b contains an entry for the program counter (PC) corresponding to the instruction stored in the Decode Instruction Buffer (D) 120. During normal sequential instruction execution, PC-D 128b increments by an amount of 4 at incrementer 128 (since each instruction is 4 bytes wide) when a valid instruction path is flowing through the pipeline. Similarly, when a branch instruction in the instruction path is executed (as discussed below) the correct target address for such branch instruction is also set in PC-D 128b through input A to MUX_PC 128a, so that the correct target instruction will also be loaded within Decode Instruction Buffer 120.

Figure 2:
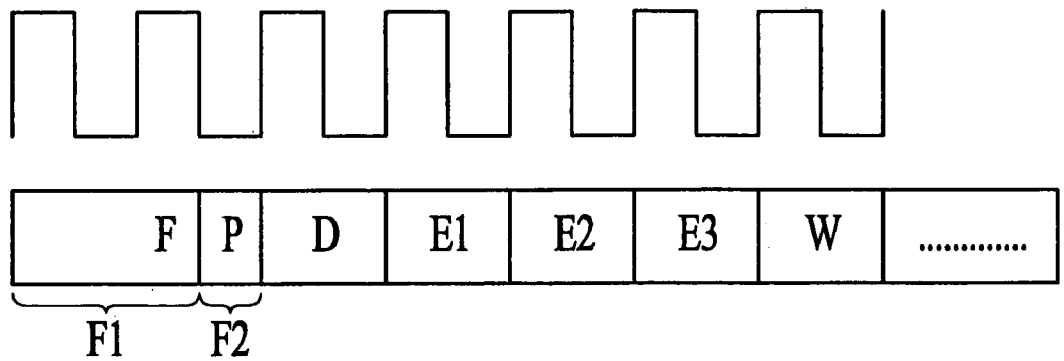
FIG. 2 depicts the various operational stages used in a pipeline employed in the computing system of the present invention.

The stages of the pipeline thereafter use a Decode Unit (DEC) 125, for performing both a pre-decoding and decoding operation during a second pipeline stage. DEC 125 generates a number of control signals based on the type of instruction that is pre-decoded/decoded, and these signals (described below) are passed on by way of control signal bus 129. In the preferred embodiment, a pre-decode operation is performed very rapidly when the instruction is loaded, to determine if it is a branch instruction. In this way, the branch control handling can be executed very quickly in turn. This pre-decode operation can be implemented with any of a variety of standard techniques commonly employed in the art for quickly identifying particular instruction types. As illustrated in FIG. 2, the pre-decode operation (P), in fact, takes place during (overlaps) the first stage of the pipeline's operation (during the second phase F2 of the F stage) and prior to the second decoding stage (D) to ensure proper timing for the remainder of the branch control circuitry.

Looking at FIG. 1 again, the decoded instruction output from DEC 125 passes to two (2) E1 Operand Buffers (E1) 127a and 127b, respectively for storing operands for program instructions that are being processed in an execution stage (E1 stage in FIG. 2) performed by Arithmetic Logic Unit (ALU) 130 as part of a third pipeline stage. As can be seen in FIG. 2, there are actually three execution stages E1, E2, E3; the operations taking place during such stages include the following:

E1: the ALU 130 performs most calculations here (ADD, SUB, etc.) including calculating target addresses based on information in the branch control (PT) instructions, and also resolves all conditional branches. In a typical implementation the results of a compare operation associated with the branch are forwarded as a 1 bit result (branch false signal) to FECTL 101 during the E1 stage (FIG. 2) and used to update HB 104. After this, active preloading (described below) can be invoked. This same result is also supplied to BRCTL 150 and DEC 125. If everything in the branch is as predicted, no changes are made to the branch execution, target addresses, target instructions, or their loadings. Otherwise, however, a mis-prediction repair process (discussed below) during the next stage (E2).

E2: This cycle is used for accessing data cache 145 through load/store latch 136, and for continuing execution of other multi-cycle instructions (such as MUL). In addition, if a mis-prediction occurs during this cycle, BRCTL 150 re-directs program flow to the correct flow during this stage. Depending on the actual branch instruction, and whether the correct next instruction has been fetched or not, some bubbles may be introduced in the pipeline. In addition, for branch control (PT) instructions, the new content for the target address registers, which was calculated in E1, is forwarded to BRCTL 150 during this cycle. In a later stage (W) it is actually written into the target address registers discussed below. This same information, however, is also forwarded during the E2 stage to FECTL 101 so that a target instruction can be preloaded in preparation for the actual branch instruction.

E3: During this cycle, DC 145 returns any data needed for load/store operations, and multi-cycle instructions continue execution. During this cycle, IC 105 can be accessed to begin preloading the target instruction indicated by the branch control (PT) instruction. In the preferred embodiment, any higher priority fetch operations from IC 105 are resolved prior to the target preloading.

Connected to an output of ALU 130 are a set of General Purpose Registers (GPR) 135, and a load/store address register 138 for storing an address used for a load/store operation with Data Cache 140 as part of a later pipeline stage. These circuits are updated during a W stage shown in FIG. 2. In a preferred embodiment, Data Cache includes a 4-way, 32 Byte line associated cache, such that the entire capacity is 32 KB.

An Instruction Address Register set for Addresses of branch targets (IAR.A) 140 stores target addresses for branch instructions as they are computed by ALU 130 and loaded during the W stage. Each of the entries in IAR.A 140 has a related corresponding entry in IART 110 above. As noted above, by using a branch control (PT) instruction, the target addresses can be prepared in advance, and stored as a 32 bit entity in one of eight (8) entries. The output of IAR.A 140 and ALU 130 are both fed to a branch selector/mux 146, which selects one such input based on a control signal provided by Branch Control circuit 150 (BRCTL) on branch control line 151.

BRCTL 150 is generally responsible for executing any branch instructions, as described below. This circuit receives the decoded branch and branch control instructions, determines whether branch condition and target addresses are known, and resolves/predicts the outcome of the branch. If the branch condition is unknown, BRCTL 150 predicts the branch conditionally based on a branch hint bit (BHB) (discussed below) within the branch instruction. At this point, the target address should already be known (as explained below) because of the branch control (PT) instruction. In a number of cases, branch latency can be effectively eliminated if the prediction is correct. This is because, when the branch is executed, usually it is the case that (1) either the target instruction is already loaded in IART 115, and will be available if the branch is correctly predicted; or (2) the target instruction is not loaded in IART 115, but can be fetched and decoded before the branch condition is even resolved. On the other hand, if for some reason the target address is not known when the branch instruction is decoded, there is some latency because the branch instruction is held in the decode stage until the target address is ready.

Accordingly, within computing system 100, the following general procedure is used during a branch operation:

(1) During decoding stage D, BRCTL sends the branch target address, IAR number, and branch prediction information to FECTL 101. If the prediction is that the branch will be taken, and the target instruction is already preloaded into IART 115, then it is read from this buffer, and loaded into D 120 so that it will be ready for decoding in the next cycle.

(2) Still in decoding stage D, if IART 115 has not been preloaded, FECTL 101 sends a fetch request to IC 105 using the branch target address provided by BRCTL 150. This results in the instruction being loaded from cache 105 to IB 110 in time for it to be decoded in the event the prediction is proven accurate. If IART 115 has been preloaded, FECTL 101 sends a fetch request to IC 105 using the incremented target address in IAR.IA instead of the target address provided by BRCTL 150 to fetch the next instructions required as target instructions for IART 115.

(3) If the prediction is "not-taken" in the decode stage, and the fall-through instruciton (the next instruction after the branch, but not the target of the branch if it were taken) is in IB 110, then it is shifted to be ready for decoding in the next cycle. FECTL 101 sends a preload request for the predicted not-taken instruction, if it is not already loaded into IART 115. This helps in the case that the branch is mis-predicted, because the target instruction will still be available if it later turns out to be needed.

(4) In the E1 stage, BRCTL 150 receives the actual resolution of the branch condition, and verifies it against the prediction before the end of this cycle. BRCTL then provides the IAR number to FECTL to prepare for an actual branch in the E2 stage.

(5) During the E2 stage, if the prediction is correct, everything proceeds normally. Otherwise, BRCTL sends a squash signal to remove invalid instructions from the stages that need purging. If it is the case that the branch was predicted not taken, but it actually was, then the BRCTL sends the correct target address to FECTL 101 with information that the branch was actually taken (AKTN command). FECTL 101 then changes the instruction stream to the correct target instruction, and additional instructions are demanded from IC 105 if needed.

(6) If during the E2 stage the mis-prediction is of the other variety—i.e., predicted taken, and is actually not taken—BRCTL sends the PC of the instruction following the branch instruction to FECTL with information indicating that the prediction of "taken" failed (CONT command). FECTL then changes the execution direction back to sequential, and gets the next fall through instruction ready for decoding in the next cycle.

(7) In case an unconditional branch is in the D stage, BRCTL 150 sends the branch target address and target register number to FECTL 101. If IART 115 is already preloaded, the target instruction is read and moved into D 120 to be decoded in the next cycle. If IART 115 is not preloaded, FECTL issues a fetch command to IC 105 to get the necessary target instructions.

The above is a detailed accounting of the operation of the computing system 100 from a temporal perspective (i.e., looking at the status of particular pipeline stages at different times). An additional complementary accounting, taken from an instruction perspective (i.e., looking at the behavior of the computing system 100, and specifically BRCTL 150 in response to a specific type of branch instruction) is also provided further below.

The branch control signals generated by BRCTL 150 are also described in more detail below, and in the accompanying figures, which including comprehensive timing diagrams. As the architecture and timing requirements of such circuit are easily gleaned with reference to the present disclosure, and such can be implemented by a variety of suitably configured and connected hardware logic, memory and clocking circuits known in the art, such circuits are not discussed at length herein.

A Target Instruction Address Register Incremented Address buffer (IAR.IA) 155 stores entries containing incremented target addresses, if the corresponding instruction stored in IART 115 represents a valid target instruction for a branch. In this embodiment, 8 separate entries are provided for IAR.IA 155. This circuit is loaded by reading and incrementing fetch addresses (by +4 or +8) output by Fetch Instruction Latch 103, when such correspond to target instruction addresses for branch instructions.

Furthermore, while not shown, it will be understood to those skilled in the art that other support circuits typically associated with processor 100, including a bus interface unit for updating IC 105 and DC 145, a floating point unit, a multi-media unit, etc., are not explicitly shown herein, as they are only ancillary to an understanding of the present invention. These are but examples, and it is understood that the present invention can operate with a variety of such circuits, and that the latter can be implemented in a variety of ways that are not material to the teachings of the present disclosure. In addition, while only a single pipeline is illustrated above, the present teachings are not restricted to such embodiment, and the benefits herein are plainly extendible to mult-pipeline environments.

Figure 2A:
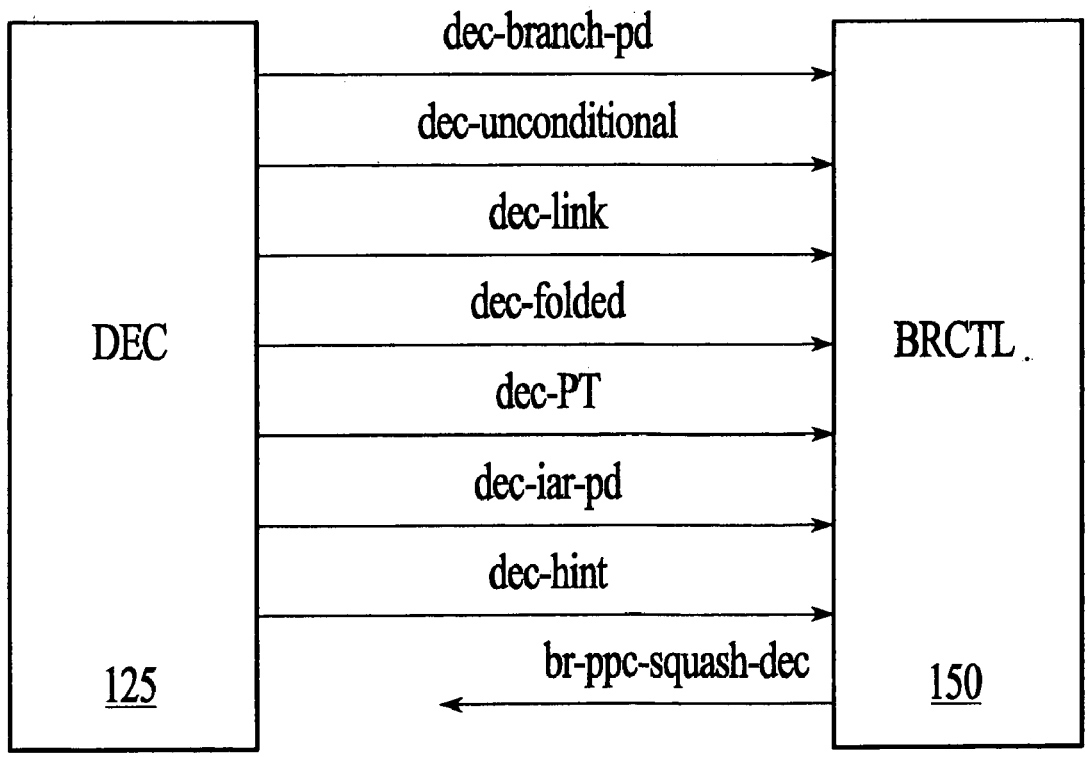
FIG. 2A provides a more detailed breakdown of the significant signal interconnections between a branch control and decoder circuits of the present invention.

As alluded to earlier, the following control signals, shown generally in FIG. 2A, are generated by DEC 125 on decode control line 129 during the pre-decode stage (see FIG. 2) as inputs for use within BRCTL 150:

(1) dec_branch_pd: this signal indicates that a branch instruction is in pre-decoding stage (DEC 125)

(2) dec_unconditional: this signal indicates that there is an unconditional branch in decoding stage 125

(3) dec_link: signals that a unconditional branch/link is in the decoding stage (4) dec_folded: indicates that a conditional branch (folded) is in the decoding stage (5) dec_pt: this signal indicates that a branch control instruction (PT) is in the decoding stage 125

Figure 2B:
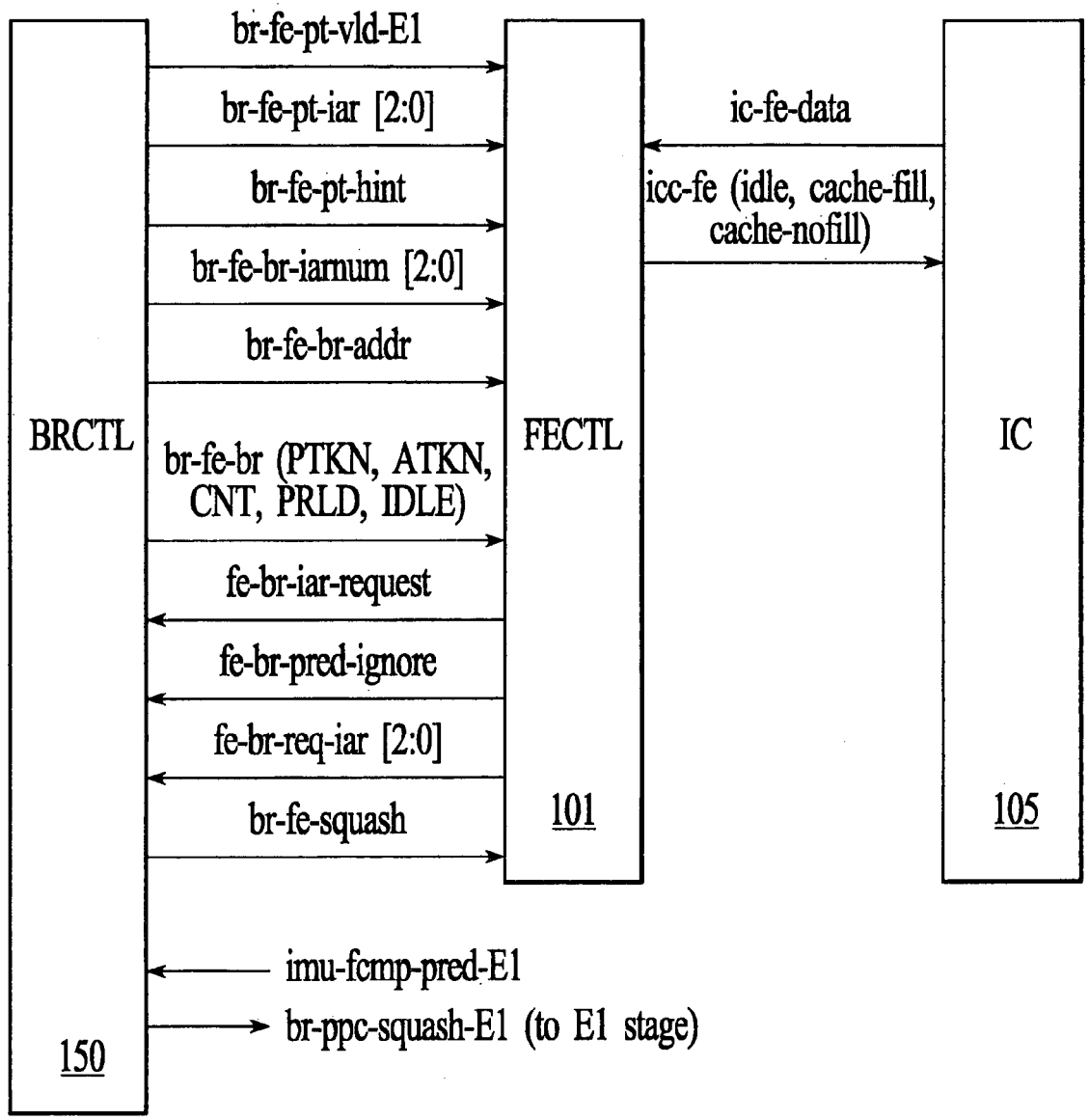
FIG. 2B similarly provides a more detailed breakdown of the significant signal interconnections between branch control, fetch control and cache controller circuits of the present invention.

(6) dec_iar_pd [2:0]: this signal, three bits in width, indicates which Instruction Address Register is designated (pointed to) by the PT and/or branch instruction as containing the target address (7) dec_hint: this signal is Hint Bit attached to both PT and conditional branch instructions;

As further alluded to earlier, the following control signals, shown generally in FIG. 2B, are generated by BRCTL 150 on branch control line 152 as inputs for use within FECTL 101:

(1) br_fe_$_{pt\_}$vld_el: this indicates that a branch control (PT) instruction in E1 is being executed (2) br_fe_br_addr [31:0]: this provides the branch target address (3) br_fe_pt_iar[2:0]: this indicates the IAR number pointed to by the PT instruction in the E1 stage (4) br_fe_pt_hint: indicates the value of the BHB of the PT instruction (5) br_fe_squash: this is used to squash a target fetch in case of a misprediction (6) br_fe_br_iarnum[2:0]: indicates the IAR number attached to br_fe_br$_{13}$ command (7) br_fe_br_command: indicates a branch instruction. These commands are structured also to include the following information:

[i] PTKN: predict taken
 [ii] ATKN: actual taken
 [iii] CNT: continue=predict taken failed
 [iv] PRLD: preload
 [v] IDLE: idle BRCTL 150 also generates a "squash"—br_ppc_squash_dec and br_ppc_squash_E1, which are used by a pipeline control unit (not shown) to remove instructions from DEC 125 and ALU 130 when they are no longer valid. This type of instruction squashing operation is well-known in the art, and therefore any conventional implementation compatible with the present invention can be used. BRCTL 150 also receives the branch false signal referred to above, which is identified more specifically in other places in the figures as imu_fcmp_pred_ex1.

Similarly, the following control signals, also shown generally in FIG. 2B, are generated by FECTL 101 on branch control lines 152 as inputs for use within BRCTL 150:

(1) fe_br_iar_req: indicates a preload request (2) fe_br_req_iar[2:0]: indicates the IAR number attached to fe_br_iar_req (3) fe_br_pred_ignore: signals that the predicted taken target fetch was ignored It further recieves a feedback signal ic_fe_data from the controller portion of IC 105, which is used to confirm that two instructions were indeed read out from the cache in response to a preload request.

As note earlier, MUX_BR 146 is a selector for a target address. MUX_BR 146 is controlled by a selector signal output on branch address control line 151 by BRCTL 150, which indicates whether there is an outstanding PT instruction. The control logic for this selector is as follows:

---
If (outstanding PT instruction)
　Select Input A
Else
　Select Input B
---

If the branch is mispredicted, however, input C is later gated to restore normal sequential instruction flow (PC+4).

Similarly, MUX_FE 102 is a selector for a fetch address. MUX_FE 102 is controlled by selector signals from FECTL 101 (indicating whether there is a branch instruction, and whether the IAR.IA entry is valid) on control line 106. The control logic for this selector is as follows:

---
If (branch instruction)
　If (IAR.IA entry is valid)
　　Select Input A
　Else
　　Select Input B
Else
　Select Input C
---

A fetch address is stored in Instruction Fetch Address latch (IFAL) 103 as discussed earlier. When this address is sent to IC 105, an additional set of fetch command signals, illustrated generally as icc_fe_command in FIG. 2B, are generated by FECTL 101 and sent along as well on line 106 to control the cache access. This includes the following control information:

(1) cache_fill: access the main memory for cache fill when cache miss happened.

Figure 1A:
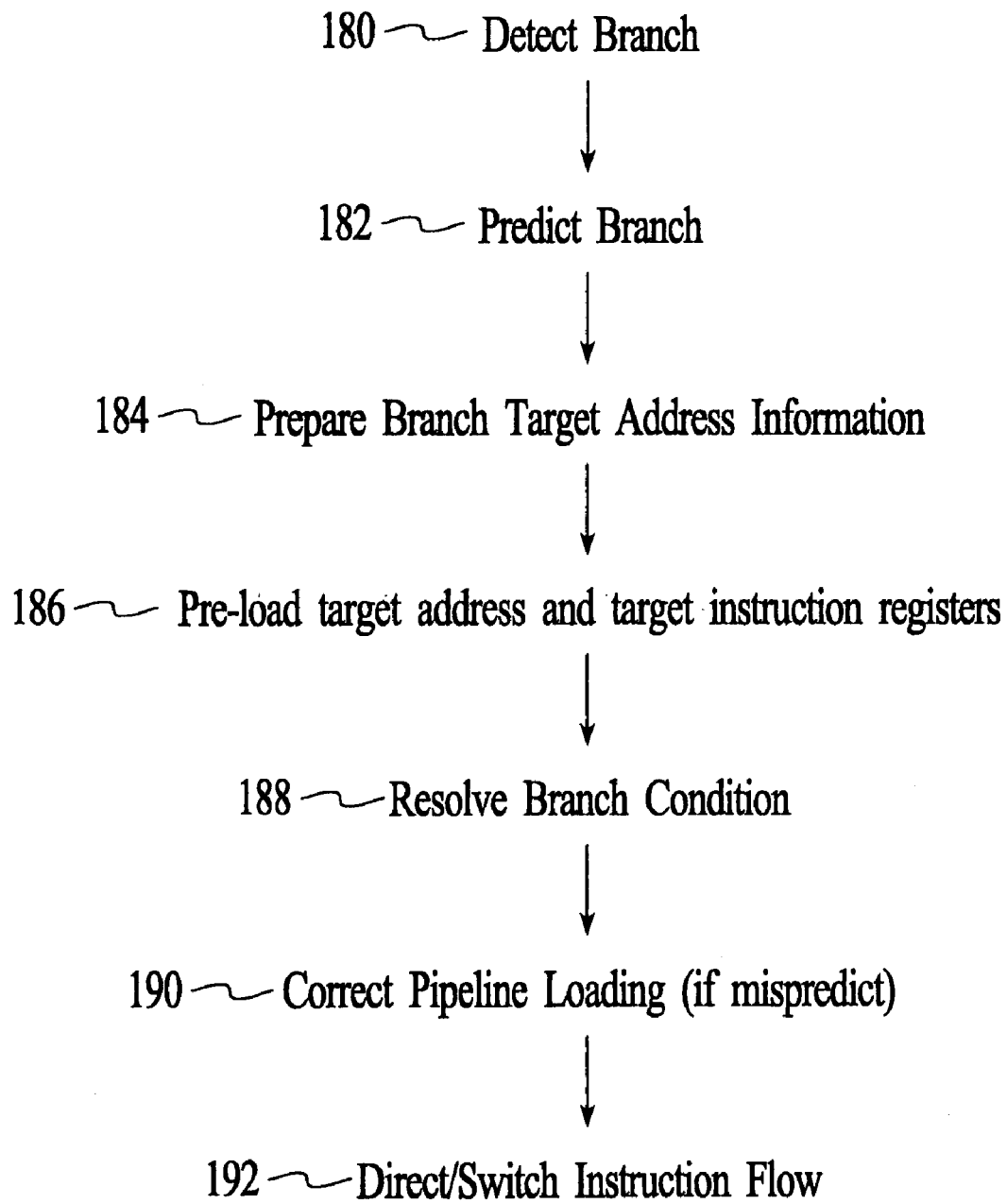
FIG. 1A is a flow chart depicting the general process used by the computing system of the present invention for handling branch operations.

(2) cache_no_fill: do not access the main memory for cache fill when cache miss happened (3) idle: no access to cache The operation of processor 100, including the other various inventive aspects of the present invention, can be gleaned with reference to the FIG. 1A, and the examples that follow. As seen in FIG. 1A, the overall process employed in the present invention includes the following basic steps: a branch operation is detected first at step 180; in this case, the branch-control (PT) instruction in fact signals this upcoming operation to computing system 100. Then, based on compiler/software analysis, a prediction is made at step 182 concerning whether the branch instruction is likely to be taken or not taken (by setting the hint bit noted earlier). Next, branch target address information is prepared at step 184, based on information provided in the PT instruction. As explained below, this information may already be available prior to detecting the branch, due to preloading operations. With this data, computing system 100 then sets up the pipeline to pre-load the appropriate target address registers and target instruction registers at step 186. The branch condition is then resolved at step 188, to determine if the branch is actually taken or not-taken. Based on this determination, at step 190 the computing system then determines whether any necessary adjustments need to be made to the pipeline because of a mis-prediction. Finally, at step 192, instruction flow is appropriately directed to the correct instruction sequence, based on the fact that any necessary target instructions for a correctly predicten branch will now available for execution. While the aforementioned steps are shown in a particular sequence, it is not necessarily the case that they must be executed in such manner, and the present invention is not limited to any particular arrangement or timing of such steps. For instance, the branch detection operation (at step 180) is performed within decoding unit DEC 125, but it is usually the case that every branch operation is already predicted (step 182) by that time. Furthermore, as is apparent from the discussions herein, many of these steps take place at the same time, or overlap significantly from a temporal perspective. Thus, it will be understood by those skilled in the art that the above is a simplified explanation of the detailed operation that is described herein and in the accompanying figures, and that it is not intended to portray any required and/or fixed relationship between the various processes employed in the present invention.

A more detailed accounting follows of the particular functions performed by the aforementioned branch handling circuits, and their interactions during branch operations.

Non Branch Instruction (Ordinary Instruction Such as an Addition Instruction

In a typical case not involving a branch instruction, a fetch address is set in FAL 103. During an F1 and F2 stage (2 cycles) of the pipeline's operation, IC 105 is accessed based on the fetch address, and the read out data is sent to IB 110. Two sequential instructions can be sent at once since instruction bus 107 is 64 bits in width. IB 110 is read (from the top) and an instruction is then stored in decode buffer 120, also during stage F2. In this case, IB 110 and D 120 are connected via MUX_D 118 since the previous instruction is not a branch instruction. In this case, an addition instruction in D is decoded by DEC 125 during a decode (D) stage. Any necessary data items are also read out from GPR 135 during the D stage and set in E1 latches 127a and 127b as operands for the addition instruction. The operand(s) in E1 127a and 127b are then acted upon by ALU 130 during an E1 stage to effectuate an addition operation thereon. The result of this calculation is then stored in GPR 135 during a write (W) stage. While not shown explicitly in FIG. 1, it is implicit that there are additional pipeline stages (e.g., E2 and E3) within the circuit designated 130, and they are referenced below where necessary to an explanation of the present disclosure. The particulars of the same are omitted here, however, since they are not crucial to an understanding of the present inventions.

Branch Control (PT) Instruction

The same operation as above takes place, except that, when a branch control (PT) instruction is decoded by DEC 125, any necessary data must be read out from GPR 135, or PC_D 128b (because of the flexible nature of the PT instruction, i.e., that displacements from the PC or register set can be used in computing target addresses) and set in E1 latch 127b as an operand. During this same D stage, DEC 125 generates a series of control signals on line 129 to BRCTL, including dec_pt (indicating a decode of a PT instruction), as well as information for the additional parameters associated with the PT instruction, including dec_iar_pd and dec_hint. Next, during an E1 stage, the operands stored in E1 latch 127b are operated on by ALU 130. At this same time, BRCTL 150 asserts a number of control signals on line 152 to FECTL 101, including br_fe_pt_el (indicating execution of a branch control instruction) and also br_fe_pt_iar and br_fe_pt_hint as discussed above. Again, in the preferred embodiment, the information for br_fe_pt_iar and br_fe_pt_hint were gleaned at the decoding stage D by DEC 125. During this same E1 stage, BRCTL 150 invalidates any instruction entry in IART 115 that exists having a target address stored in IAR.A 140 and pointed to by br_fe$_{pt}$_iar. This is done by setting the first (valid) bit in the instruction validity register to zero for such target instruction in HB 104. In addition, the br_fe_pt_hint information is used to set the second (hint) bit in HB 104 for the target instruction. After the E2 stage, the new target address is available for use in preloading, discussed further below. During the W stage, the results of ALU 130, including the calculation of the new target address, are stored in the IAR.A 140 entry designated by br_fe_pt_iar.

Active Preloading

FECTL 101 performs a number of important functions in the present invention, including preloading of branch target instructions and fetching of predicted branch target instructions. The latter function is discussed in more detail below in connection with conditional branches, but generally refers to the process of loading instructions from the instruction cache so as to maintain normal program flow, either from sequential execution (fetching instructions to be loaded into IB 110) or branch execution (searching IART 115, and if no target instructions are found, fetching instructions to be loaded).

Pre-loading refers to a process whereby instructions are identified, retrieved and put into the pipeline ahead of time (i.e., before they are needed) by FECTL 101 during otherwise idle cache periods to ensure a continuous, uninterrupted stream of instructions. In a preferred embodiment, both active and passive preloading processes are used. Within the context of the present disclosure, "active" preload refers generally to the fact that FECTL speculatively requests instructions from IC 105 based on predicted branch conditions (i.e., taken or not taken). In other words, active preloading attempts to load IART 115 with instructions before the occurrence of the branch instruction. The active preloading procedure of the present invention is fairly sophisticated, and is explained in detail below.

In contrast, "passive" preloading is far more simple, and can be explained as follows. Basically, this procedure involves loading IART 115 within target instructions during as they occur during normal program flow. It is not always possible to pre-load IART 115 with the necessary target instructions (resulting in a 2 cycle penalty). In such cases, when the target instructions are instead retrieved from IC 105 during normal program flow, IART 115 is nevertheless loaded with such instructions after they are decoded by DEC 125, thus ensuring that if the branch occurs again, the correct target instructions will nonetheless now be available. Thus, this type of preloading occurs after a branch target is decoded, but ensures that the associated branch target instruction will be unavailable at most once.

In the present invention, active preload is not synchronized with execution of instructions in the present preferred embodiment, but it is apparent nonetheless that it could be done this way in other applications of the invention.

Returning now to a more thorough explanation of active preload, FECTL 101 preferably generates a preload request to IC 105 if it is viable to do so (i.e., BRCTL does not require some other operation, such as an instruction fetch for a branch) and when there are sufficient instructions in IB 110 to keep the pipeline full. In a preferred embodiment, a preload is not performed unless there are at least two available instructions in IB 110 ready for decoding; this is a compromise to ensure that the pipeline does not stall from an overabundance of preload requests interfering with normal instruction fetches.

To determine which instructions to preload, and which IART entries to invalidate, FECTL 101 monitors the information for the target instruction entries as stored in HB 104. More specifically, during any clock cycle, it selects those entries where the instruction validity register has a bit value indicating that the corresponding entry in IART 115 is invalid (i.e., valid bit=0) and where the associated hint bit in the pre-load mask register for the IAR entry indicates a high probability for a branch to the target instruction (i.e., hint bit=1). In this manner, the present invention bases the pre-loading process on a prediction scheme that focusses on those branches that are likely to be taken, but for which there are no valid instructions in place ready to be executed.

If more than one such entry is detected, a single entry is still preferably chosen, based on a loading priority within HB 104; for example, a simple approach is to use the entry with the smallest index number. Therefore, the select mask register is consulted, and the lowest rank IAR available is selected. After this IAR entry is selected for preload, the corresponding bit in the select mask register is cleared to ensure that there are not subsequent attempts to pre-load this entry again. Because of the limited idle time available for pre-fetching operations, it can seen that, under some circumstances, lower ranked IARs (such as IAR6 or IAR7) may never be reached for an active preload request. Since IAR entries can now be specified at the instruction level (as part of the branch control (PT) instruction), the active pre-loading behavior of the microarchitecture of computing system 100 can be controlled at the code level. In other words, the compiler can actively rank and prioritize preloading by specifing IARs of different rankings for such instructions. As an example, a branch control (PT) instruction for a likely branch could specify a low rank IAR, while unlikely branch could be provided with a high rank IAR. This prioritization approach has a number of advantages over other schemes, such as FIFO and LIFO. In the former case, no prioritization is possible, as all IARs are given equal opportunity, so there is no ability to influence or control pre-loading behavior. The latter case might be used to increase the hit rate for most recently seen branch control (PT) instructions, but is somewhat more complex to implement. For these reasons, in the preferred embodiment, the lowest-to-highest ranking methodology is used for pre-loading, with the select mask register indicating which IARs remain available at any instant in time.

The present approach further incorporates BRCTL 150 in the decision making process for a preload request as well, since the inventors have found that this results in more optimal feeding of instructions to the pipeline stages of processor 100. Thus, when FECTL 101 detects such an available entry for preloading, it asserts fe_br_preload_req on line 152 to initiate a preload request, and also informs BRCTL 150 of the entry number with the preload control data specified in fe_br_preload_iar. After BRCTL 150 receives fe_br_preload_iar, it reads out a target address from the designated entry of IAR.A based on such signal.

At this time, if there are no branch instructions that need to be executed in the same cycle, a pre-load command (PRLD) is generated by BRCTL 150 by way of the br_fe_br_command (referred to earlier) and asserted on line 152 to FECTL 101. At the same time, the read out target address is presented at the input of MUX_BR 146. Also, the register number designated by fe_br_preload_iar is sent via signal br_fe_br_iarnum [b 2:0] from BRCTL 150 for storage/entry control of IAR.IA 155.

If there are any branch instructions that should be executed in the same cycle, the preload request in signal fe_br_preload_req from FECTL 101 is ignored by BRCTL 150. When FECTL 101 receives the PRLD command embodied in br_fe_br_command, and there is no need to fill IB 110 with more instructions (i.e., when more than two instructions are stored in IB 110) FECTL 101 then begins to execute the preload. That is, FECTL 101 controls MUX_BR 146 to select the target address from IAR.A 140 on line B, and then sets this address in FAL 103 by controlling MUX_FE 102 to select input B presented there. When a preload operation is occuring, signal cache_no_fill is also asserted within the icc_fe_command by FECTL 101 to IC 105 to prohibit unnecessary accesses to a main memory system (not shown) used by the processor.

If a valid instruction corresponding to the target address is located in IC 105, it is sent by instruction line 107 to be stored in IART 115. At same time, the contents of FAL are incremented by adder 157 by +4 or +8 (depending on the number of instructions fetched from IC 105) and an entry is then stored in IAR.IA 155. The purpose of this latter step is so that additional target instructions can be quickly preloaded during later execution of any branch instruction that uses the instructions in IART 115.

The above mentioned preload operation is executed anytime after the E2 stage of a corresponding branch control (PT) instruction. If the execution of the PT instruction is not completely finished and the target address is not yet stored in IAR.A 140, BRCTL 150 detects that there is a PT instruction being executed, and accordingly controls MUX_BR 146 to send the calculation result of ALU 130 (input A) directly as a target address. It will be apparent to those skilled in the art that the determinations made by FECTL 101 in determining when to preload instructions may also be used to prefetch target instructions (i.e., if they are not available in an instruction cache, they must be fetched from main memory) if desired.

Branch Instructions

In the present preferred embodiment, three different kinds of branch instructions can be processed. These include: [1] unconditional branch instructions; [2] conditional branch instruction with a Branch Hint Bit (BHB)=1; and [3] conditional branch instruction with BHB=0.

Figures 2C, 2D:
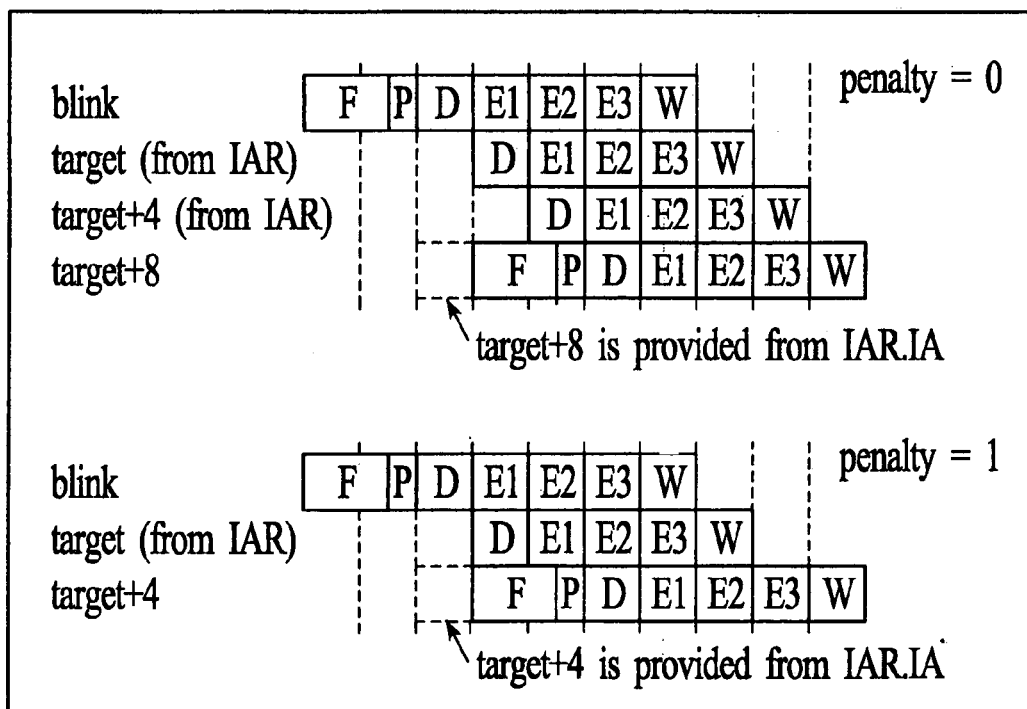

A summary of the branch handling performance of the present invention for different types of branch instructions is provided in the table of FIG. 2C. The headings include: Branch type (unconditional or conditional); Prediction (i.e., whether it is expected to be taken or not-taken); Actual Branch direction (i.e., whether it was actually taken or not-taken); and the various possible target instruction register conditions (i.e., IART having 2 instructions, 1 instruction, 0 instructions, and IAR.A not being ready). For each potential situation, the associated number of penalty cycles is identified. There are three sources of branch penalty cycles, which were alluded to briefly above:

(1) Waiting for a target address to be calculated. Because of the fact that branch instructions can be quickly pre-decoded in the present invention, it is also necessary that the target address be ready at this time as well before they can be completely decoded. Since branch control (PT) instructions do not forward the target address until the E2 stage, there will be at least one "bubble" (a single stage gap in the pipeline where an instruction is not executed) created when a branch control (PT) instruction and a branch instruction are placed back to back. In most cases, however, a reasonably efficient compiler can ensure that there are more than enough instructions between the two to avoid such a problem.

(2) Waiting for the target instruction to be fetched. This delay is a function of the latency cycles of IC 105 and whether IART 115 is ready with instructions. In the preferred embodiment described herein, IC 105 has a 2 cycle latency, and IART can hold 2 instructions. This means that the worst case scenario would require 2 cycles, and the best scenario would use no cycles.

(3) Correcting pipeline loading for mis-predictions. Mispredicted instructions must be "squashed" (removed from the pipeline); since corrections can be determined at the E2 stage, at most 2 instructions need to be removed.

It can be seen from this table that, if preloading is successful (2 instructions ready in IART 115 as shown in the fourth column) then the present invention is extremely effective in reducing/eliminating latency in computing system 100.

Detailed explanations of the flow of particular types of branch instructions (i.e., conditional or unconditional), under particular prediction scenarios (predict taken or not taken) and operating circumstances (i.e., IART ready or not ready) are now provided. While not every conceivable scenario is explained in detail below, the essential points of the inventions are nonetheless fully and accurately illustrated by these examples and the accompanying figures in a manner that will adequately teach those skilled in the art how to best practice and utilize the present inventions.

Unconditional Branch Instructions

As noted earlier, during normal operation, a fetch address is already set in FAL 103. IC 105 is then accessed based on this address during the F1 and F2 stages, and the instructions are sent to IB 110. As also noted before, the contents of IB 110 read out (from the top of the buffer) and stored in latch D 120. During the D stage (in fact in pre-decoding stage P), this instruction is decoded by DEC 125, and when it is a unconditional branch instruction, the following signals are generated by DEC 125 dec_branch_pd, dec_conditional (=0), dec_hint, and dec_iar_pd are asserted on line 129 as inputs to BRCTL 150. BRCTL 150 then checks the validity field (first bit) for the corresponding entry in HB 104 designated by dec_iar_pd to determine if IART 115 has valid target instructions for this particular unconditional branch instruction. When the validity bit=1, indicating valid instructions in IART 115, BRCTL 150 then proceeds to gate (read) such target instruction from the appropriate entry of IART 115 and sends the instruction to latch D 120 via MUX_D 118. This scheme makes it possible to put the target instruction into the D stage without incurring any penalty cycles In other words, even though the next instruction to be executed does not immediately follow the unconditional branch instruction in the program sequence, it can still be executed that way by virtue of the fact that it has already been preloaded based on the decoding/execution of the branch control (PT) instruction above, which, as noted, sets up the appropriate target addresses, target instructions, etc., so that they are immediately ready when the branch instruction is decoded in the pipeline.

Also during a decoding stage for the branch instruction, signal ATKN (branch actually taken) is sent by BRCTL 150 to FECTL 101 using the br_fe_br_command. In addition, the target address is read out from the entry in IAR.A designated by dec_iar_pd, and is presented as input B to MUX_BR 140. The IAR number holding the target address is also sent by br_fe_br_iarnum from BRCTL 150 to FECTL 101. When FECTL 101 receives the ATKN signal, it then checks the validity of the IART entry pointed to by br_fe_br_iarnum by again checking the first (valid) bit of HB 104 corresponding to such IART entry.

At this point, if the entry in IART 115 has two (2) valid instructions, this means that the branch will be executed without any latency penalty, since the target instructions are already preloaded and available for execution. Accordingly, the pre-fetching operation looks to obtain the instruction immediately following the instruction already stored in IART 115 from IC 105. The address for this instruction, however, has already been computed and stored in IAR.IA in the manner described above. Therefore, this next target address is read out from IARIA 155 (instead of IAR.A 140) and is asserted on input A of MUX_FE 102, and then selected by FECTL 101 so that it is sent to FAL 103 as the fetch address for IC 105. Thus, FECTL 101 accesses IC 105 based on this previously computed (incremented) target address. IB 110 is then loaded with the instructions in IC 105 pointed to by this target address. In this fashion, the appropriate target instructions are continuously provided in correct sequence to the pipeline, avoiding the conventional penalty cycles incurred in the prior art when a branch instruction is executed, such as from pipeline flushing, re-accessing the instruction cache to load new instructions, re-loading such instructions in the instruction buffer, etc. For this preferred embodiment, the target instruction, as well as the next instruction are loaded from LART 115, and any following instructions are then loaded from IC 105 to IB 110. It may be desirable, in some environments, to vary the size of IART 115, depending on available layout space, power requirements, etc. In general, however, to achieve good performance, this buffer need only be sufficiently deep (in this embodiment, two entries is sufficient) to offset any instruction cache latency.

Figure 3A:
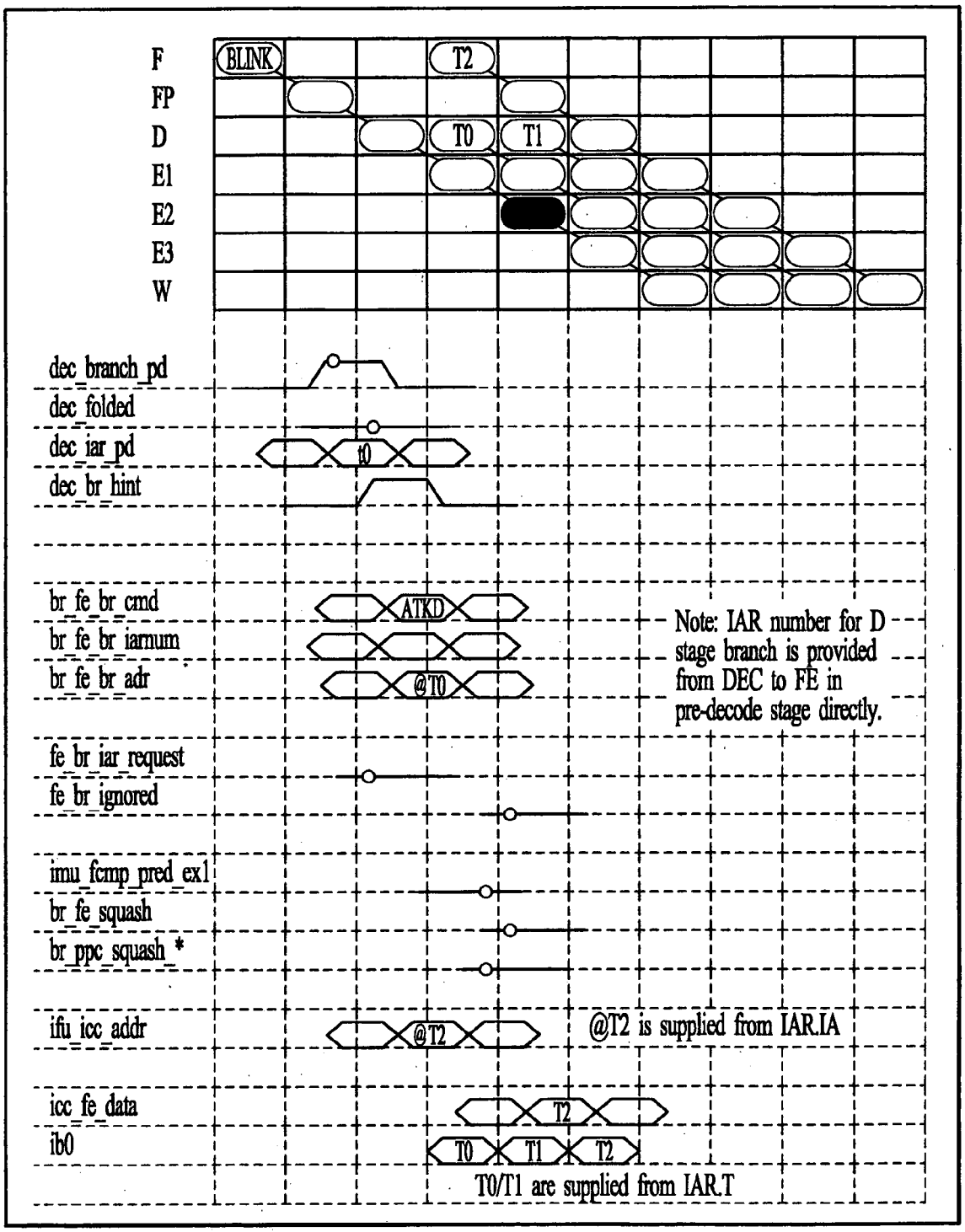
FIGS. 3A–3H are timing diagrams indicating the timing and relationship of control signals asserted by the computing system when performing a branch handling operation.

A timing diagram illustrating the timing relationship between the aforementioned signals for the above scenario is provided in FIG. 3A.

If instead the IART entry is found not valid, MUX_D 1118 is controlled to select IB 110 on input B. FECTL 101 controls MUX_FE 102 so as to select the target address on input B coming from IAR.A 140. This target address sent from IAR.A is then loaded in FAL 103, and, as above, an access to IC 105 to locate the appropriate target instruction. The valid instruction from IC 105 is then sent and stored into both IB 110 and IART 115. According to this scheme, even if the branch instructions are not available the first time, at least when the same unconditional branch instruction is executed again, IART should probably store the correct target instruction. Therefore, when such instruction is encountered later, the procedure described in the paragraphs immediately above would be carried out, and a number of potential penalty cycles are again saved by virtue of the fact that the appropriate target instructions have now been preloaded.

Figure 2E:
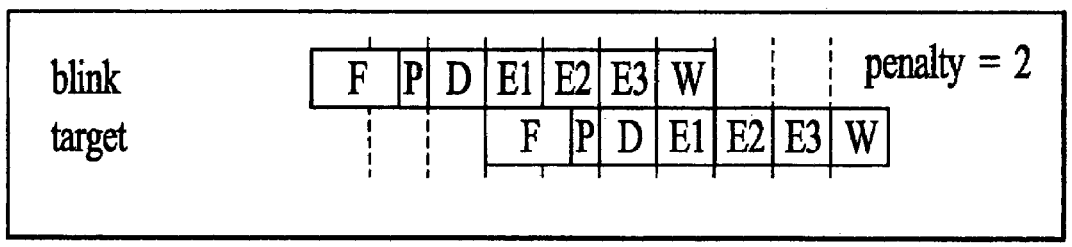
Figure 2F:
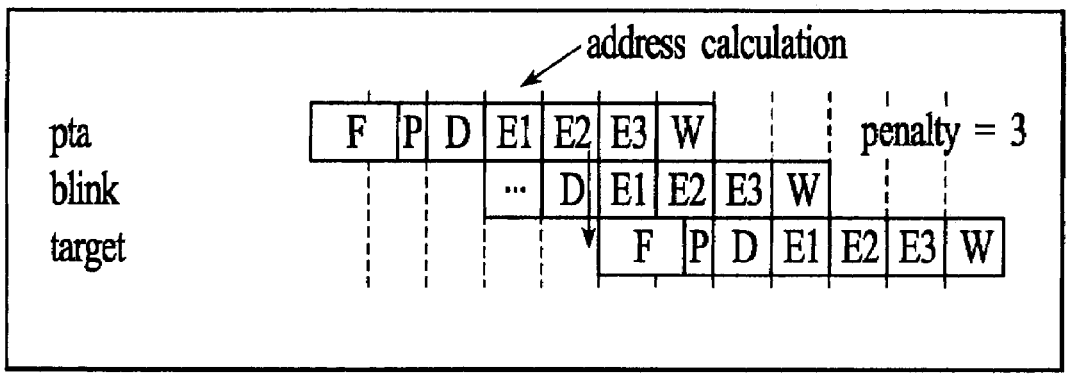

FIGS. 2D to 2F provide visual snapshots of the state of the pipeline in computing system 100 for the three possible scenarios for unconditional branch instruction execution as it can occur therein. These include: (1) Unconditonal branch, where the target instruction is available in IART 115; (2) Unconditional branch, where the target instruction is not in IART 115; (3) Unconditional branch, where even the target address is not ready (as in the case, for example, where there is not adequate separation in time between a PT instruction and an associated branch instruction). For each case, an indication is given of the pipeline loading, and the maximum latency penalty associated with such branch execution.

Conditional Branch Instruction Including with BHB=1

Basically the operation/behavior of a conditional branch instruction with a BHB=1 is the same as that of a unconditional branch instruction discussed above. The primary differences are as follows; when a conditional branch instruction with BHB=1 is decoded during the D stage, BRCTL 150 generates and asserts signal PTKN (predict taken—instead of actual taken—ATKN—as above) to FECTL 101. In those cases where the conditional branch condition is actually taken as predicted, the system behaves substantially the same as that described above for the unconditional branch instruction operation. A timing diagram illustrating the relationship between the control signals for this scenario is provided in FIG. 3B. The pipeline loading is also essentially identical to FIGS. 2D to 2F in such correctly predicted cases, so they are not repeated here.

When a mis-prediction occurs (i.e., the conditional branch is not actually taken), however, the following flow occurs instead: in the E2 stage of the conditional branch, ALU 130 determines that the condition of the branch is false, and informs BRCTL 150 of this fact through signal imu_fcmp-_pred_Ex1. BRCTL 150 then generates and asserts signal CNT (continue with predict taken failed) using br_fe_br command to FECTL 101 with a new target address. In this case, if the branch is not taken, the next instruction to be executed should be the one in IB 110 following the branch instruction sequentially in the program flow. Accordingly, the new target address is the program counter (PC) of the branch instruction+4 and this is loaded through input C of MUX_BR 146. The information in some of the stages of the pipeline, including latch D 120 and E1 latch 127a are invalidated by BRCTL 150, since they contain instructions loaded from IART 115 which are now incorrect. This results in a small latency penalty because even though the branch is actually not taken, the pipeline still has the appropriate instructions available for processing. All that must be done is that the erroneously loaded instructions must be squashed (removed), and the pipeline must be re-filled with the correct instruction stream. Nonetheless, as the number of mis-predicted branches is expected to be small, this latency penalty is believed to be substantially outweighed by the performance advantages achieved by the overall branch handling architecture described herein.

When FECTL 101 receives the CNT signal, it then sends PC+4 to FAL 103 through MUX_D 102 where it is used, in the manner described earlier, to retrieve the appropriate target instruction so that the pipeline can be re-loaded. A timing diagram illustrating the relationship between the relevant control signals for this scenario is provided in FIG. 3G.

Figure 2G:
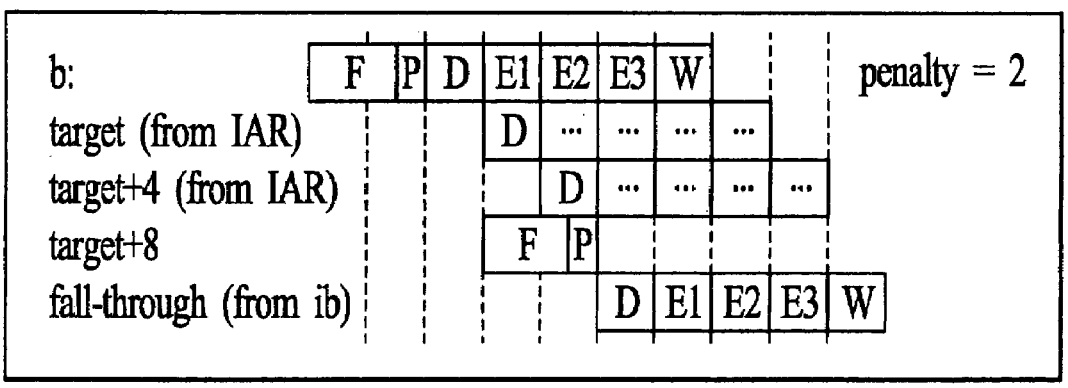
Figure 2H:
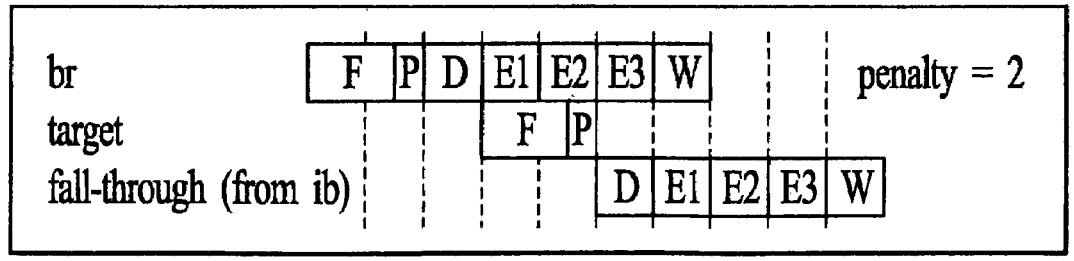

FIGS. 2G to 2I provide visual snapshots of the state of the pipeline in computing system 100 for the three possible scenarios where a conditional branch instruction is mis-predicted as taken, and it is in fact not-taken. These include: (1) conditonal branch with predict taken, actual not-taken, and where the target instruction is available in IART 115; (2) conditional branch with predict taken, actual not-taken, and where the target instruction is not in IART 115; (3) conditional branch with predict taken, actual not-taken, and where even the target address is not ready. For each case, an indication is given of the pipeline loading, and the maximum latency penalty associated with such branch execution.

Conditional Branch Instruction with BHB=0

In this situation, during the D stage of the branch instruction, a preload request (PRLD) for the branch instruction is issued by BRCTL 150. That is, when BRCTL 150 receives dec_branch_pd=1, dec_conditional=1, and dec_hint=0 from DEC 125 on line 129, BRCTL checks the validity of the entry in IART 115 designated by dec_iar_pd by looking at the first bit (validity bit) in the corresponding register entry in HB 104. If the IART entry is valid, BRCTL does nothing further. This is because, from a performance perspective, even if the prediction of the branch not being taken is later proven incorrect, there will be no latency penalty, because the correct target address for the branch is already loaded in IART 115. This scenario's signal timing relationships is provided in FIG. 3D.

On the other hand, if the corresponding entry in IART 115 is invalid, BRCTL 150 reads out target address pointed to in IAR.A 140, and sends the same to FECTL 101 on line B with a control signal PRLD (preload) in the br_fe_br_command. It also sends the IAR.A 140 entry number designated by the branch instruction using the br_fe_br_iarnum signal. If there are no conflicts with an instruction fetch for IB 110 fill, a preload request is sent to IC 105, and the operation then proceeds in the same manner as already described above for the active preload procedure.

From an operational perspective it can be seen that when the BHB indicates that the branch will not be taken, and the branch is not actually taken, program execution flow is just like that of an ordinary instruction, and there is no latency introduced. When the BHB indicates that the branch will not be taken, and the branch is actually taken, execution flow in the E2 stage is the same as that of the D stage in the unconditional branch situation. In this case, too, D latch 120 and E1 latch 127a, 127b must be invalidated.

As above for the correctly predicted/actually taken scenario, a predicted not-taken branch, actually not taken event will have pipelining parameters essentially identical to those shown in FIG. 2D for the unconditional case.

Figure 2K:
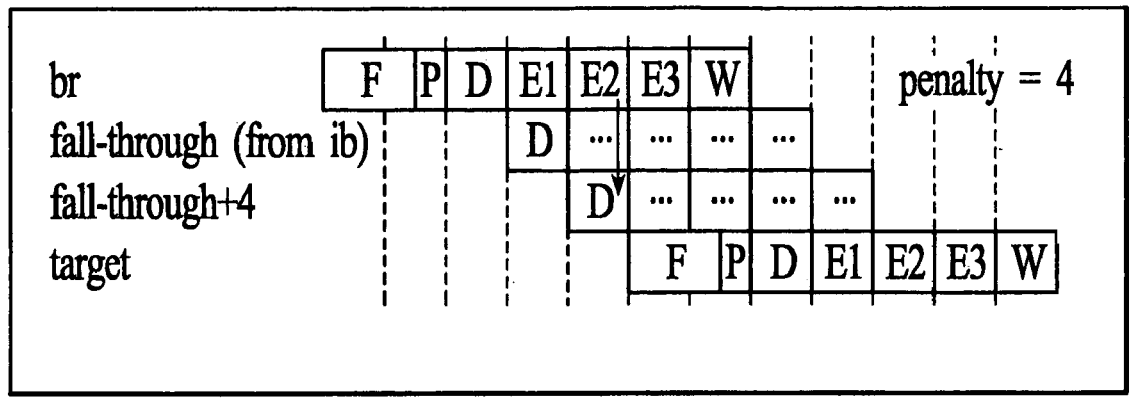
Figure 2L:
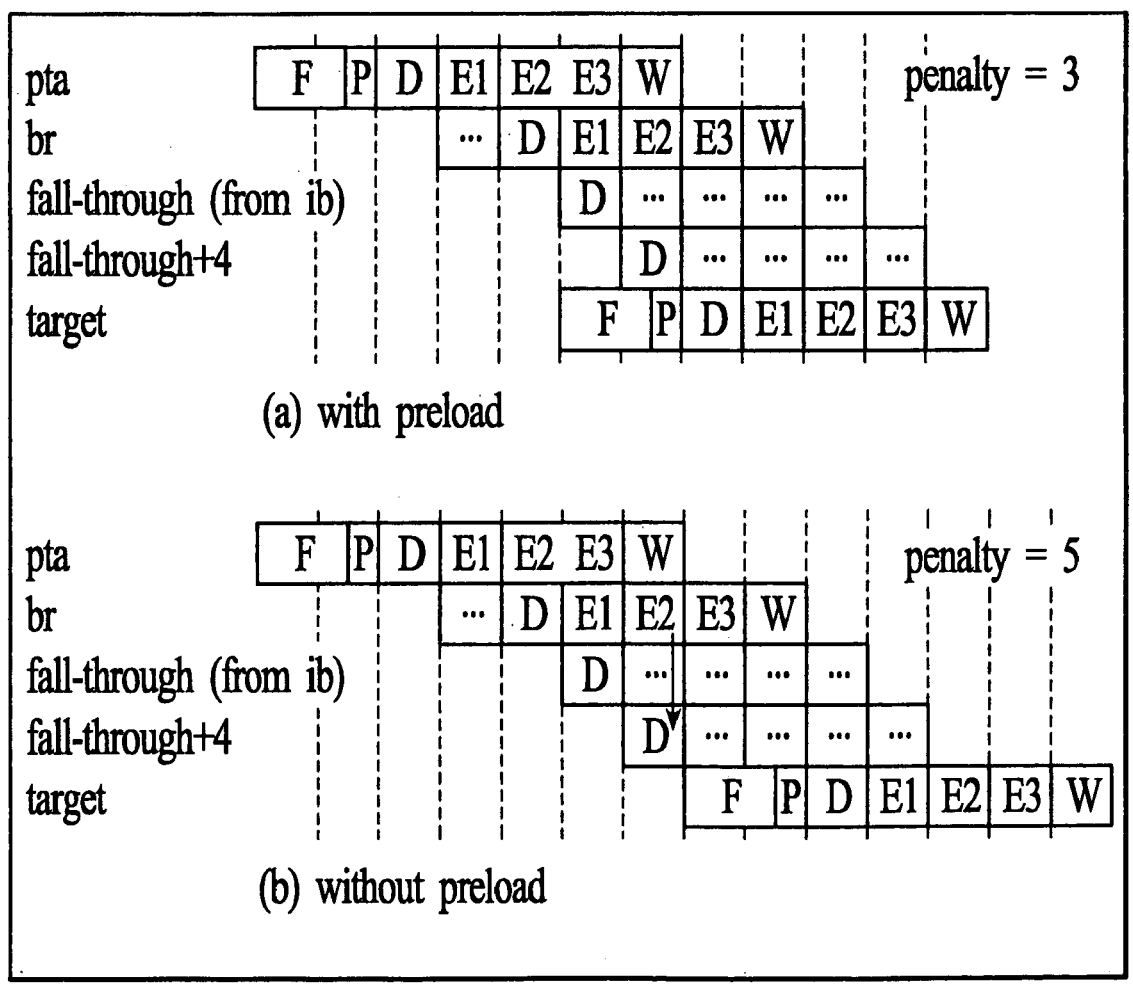

For incorrectly predicted cases of the type predicted not-taken, actually taken, FIGS. 2J to 2L provide visual snapshots of the state of the pipeline in computing system 100 for the three possible scenarios where a conditional branch instruction is mis-pre-dicted as not-taken, and it is in fact taken. These include: (1) conditional branch with predict not-taken, actual taken, and where the target instruction is available in IART 115; (2) conditional branch with predict not-taken, actual taken, and where the target instruction is not in IART 115; (3) conditional branch with predict not-taken, actual taken, and where even the target address is not ready. For each case, an indication is given of the pipeline loading, and the maximum latency penalty associated with such branch execution.

As can be seen from such figures, the present invention uses additional attempts to correct even for mis-predictions of this type. This is because, as seen in FIG. 2J, IART 115 may still have the branch instructions ready for execution, even if the branch is mis-predicted. Furthermore, even when IART 115 does not have such instructions, BRCTL 150 will still try to load them (even with a predict not-taken status for the branch) with the assistance of FECTL unless there is a higher priority fetch pending. Thus, significant potential latency cycles are avoided.

Signal Timing Considerations

FIGS. 3A to 3G are timing diagrams illustrating the various signals used (and their relationship) during operation of the embodiments described herein, including during a branch instruction handling process. These diagrams particularly describe: (1) the state of the pipeline stages; (2) the progress of the instruction stream therein; (3) the identity and relative timing relationship of the control signals discussed above generated by DEC 125, BRCTL 150, FECTL 101, and other control logic, for a number of particular operational states that may arise within computing system 100. In particular, the potential states that are described include: (1) FIG. 3A—an unconditional branch instruction being handled when IART 115 is ready with target instructions; (2) FIG. 3B—a conditional branch, with a prediction (hint bit) indicating that the branch will be taken, and IART 115 is ready with target instructions when such branch is actually taken; (3) FIG. 3C—as for FIG. 3B, except IART 115 is not ready; (4) FIG. 3D—a conditional branch, with a prediction (hint bit) indicating that the branch will not be taken, such branch is actually not taken, but IART 115 is not ready with target instructions; (5) FIG. 3E—a conditional branch, with a prediction (hint bit) indicating that the branch will not be taken, IART 115 is ready with target instructions; but such branch is actually taken; (6) FIG. 3F—same as 3E, except IART 115 is not ready; (7) FIG. 3G—same as FIG. 3D, except IART 115 is ready with target instructions. As used in these diagrams, T0–T7 refer to the IARs described above, and likewise ib0 refers to IB 110. These are but representative examples of potential instruction states, of course, and other combinations of the control signals required to handle other operational states of computing system 100 will be apparent to those skilled in the art from the present disclosure.

Figure 3B:
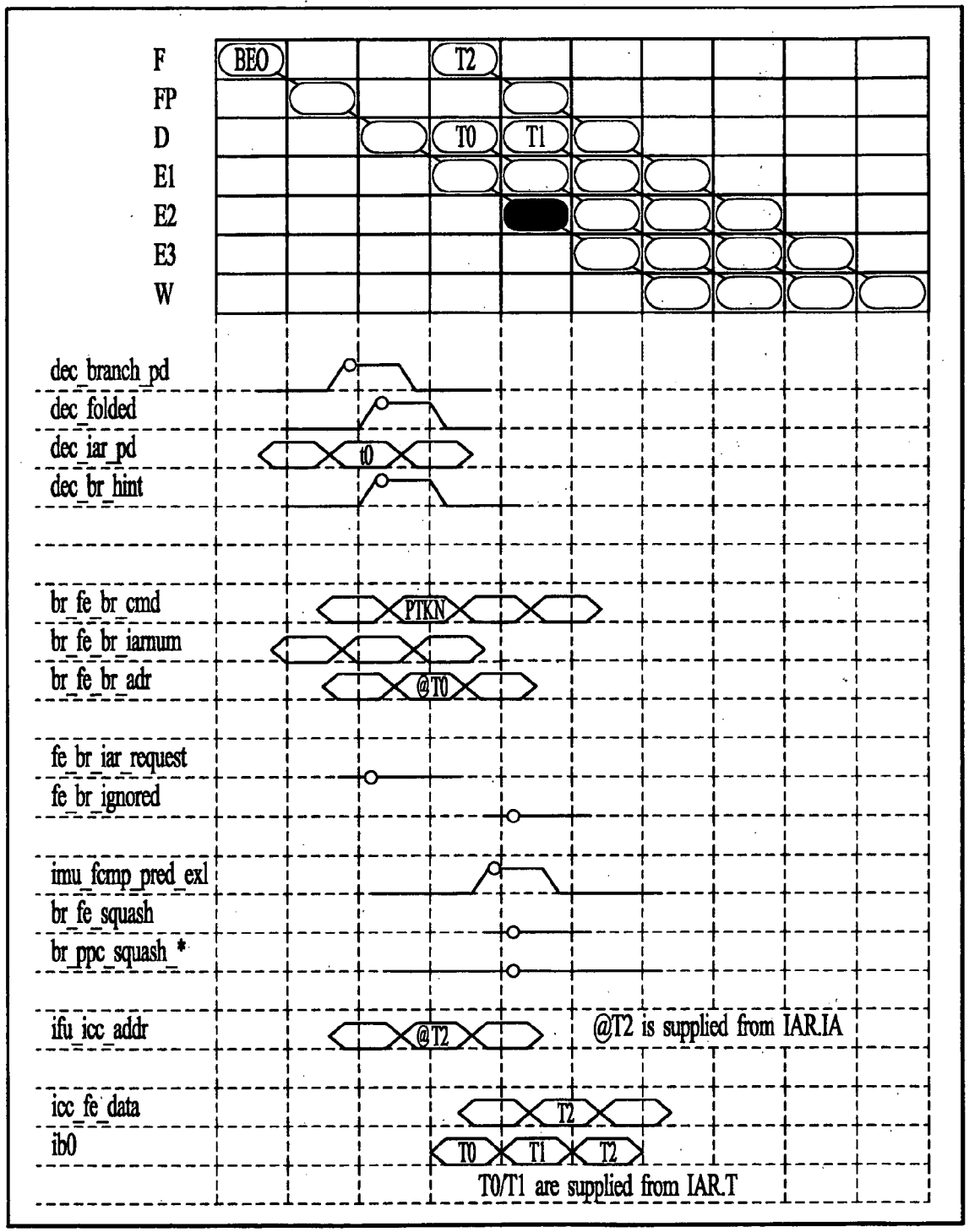
Figure 3C:
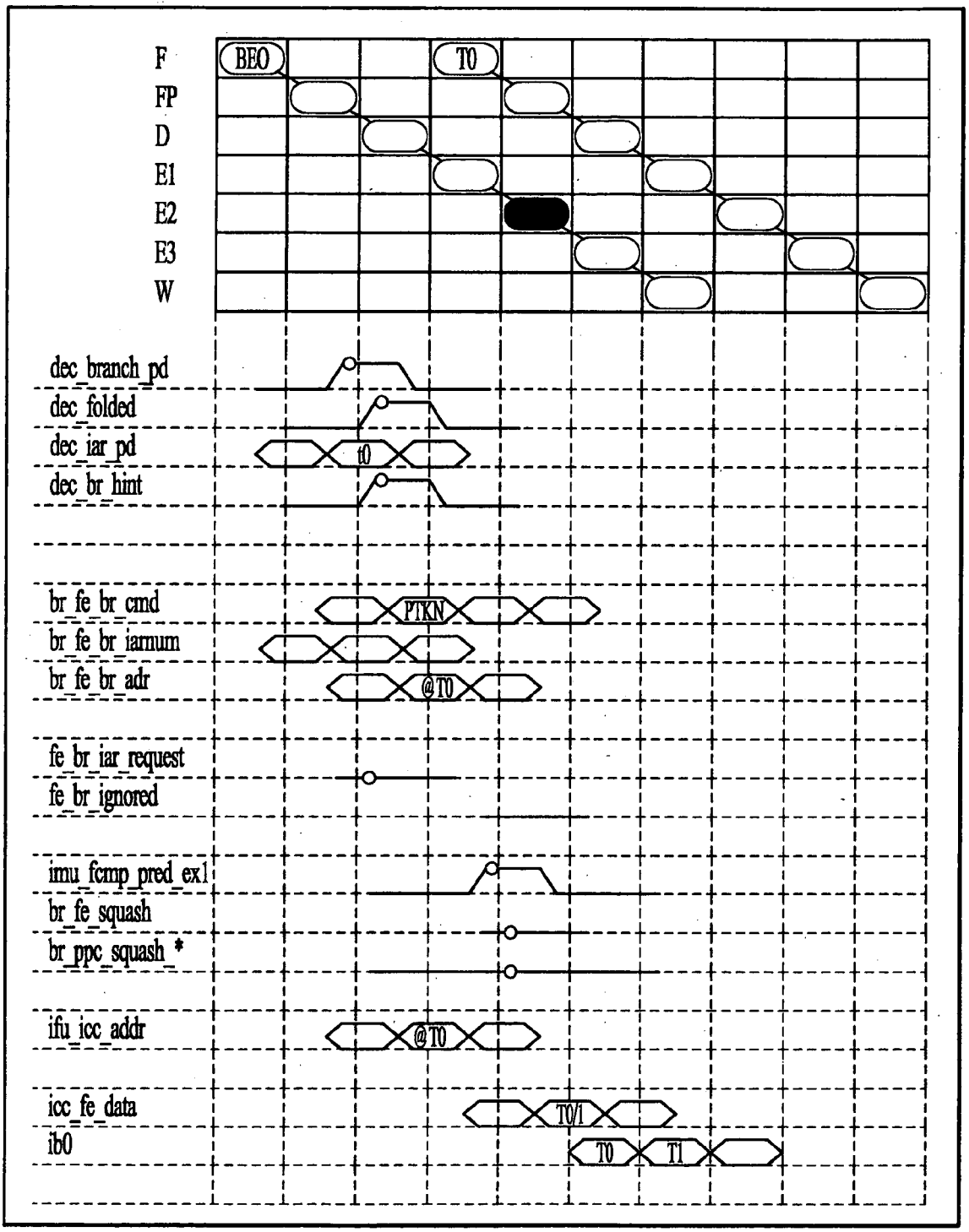
Figure 3D:
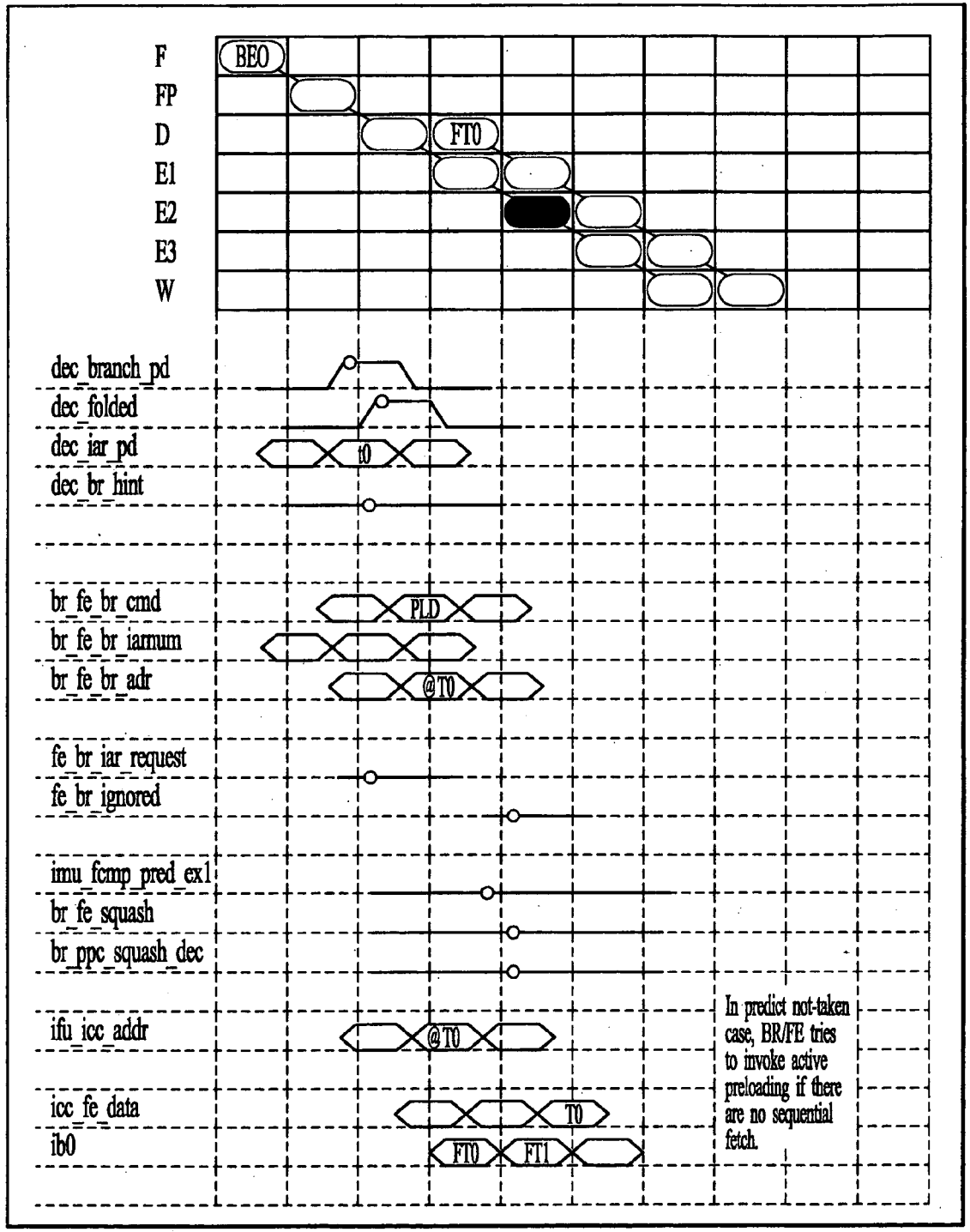
Figure 3E:
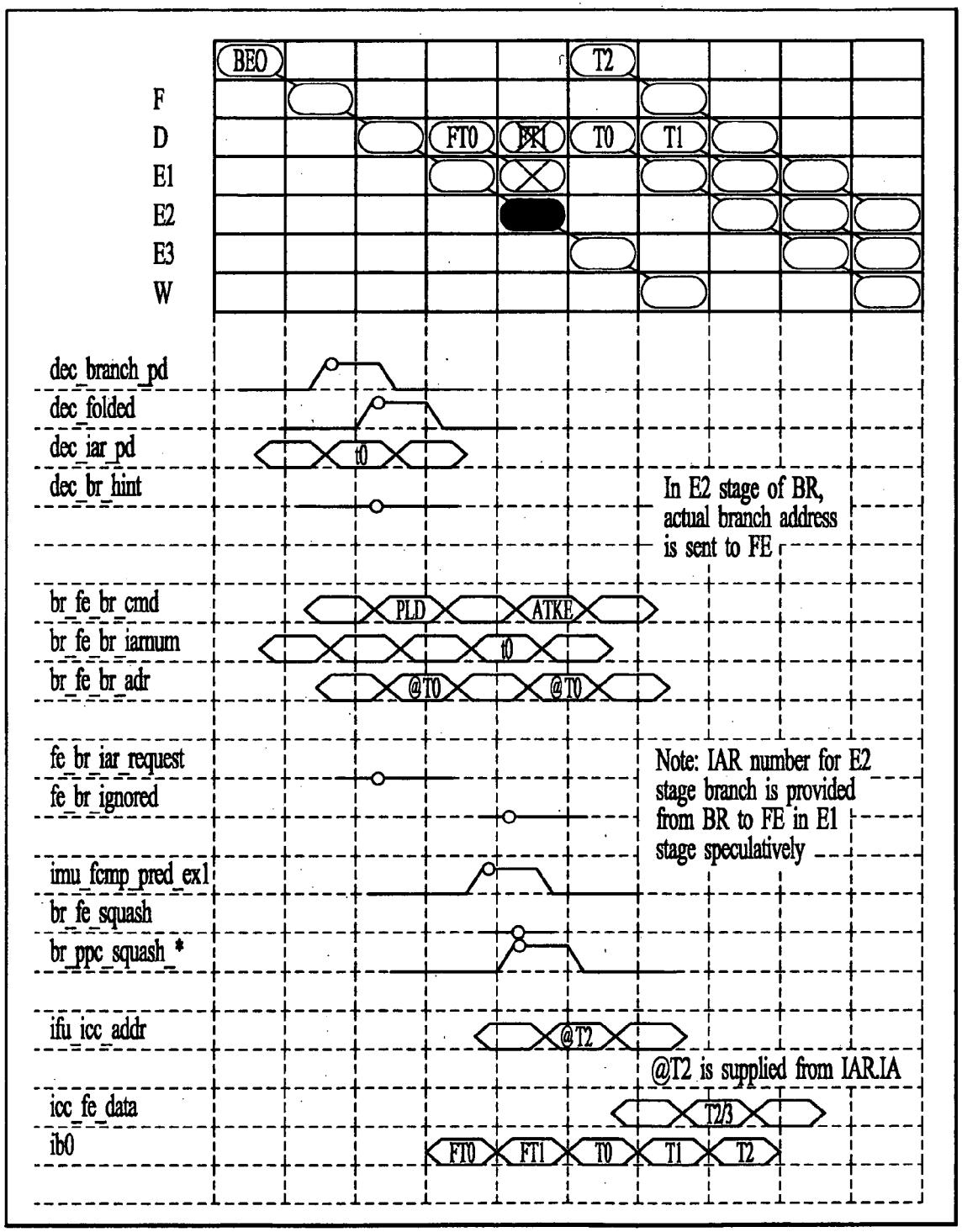
Figure 3F:
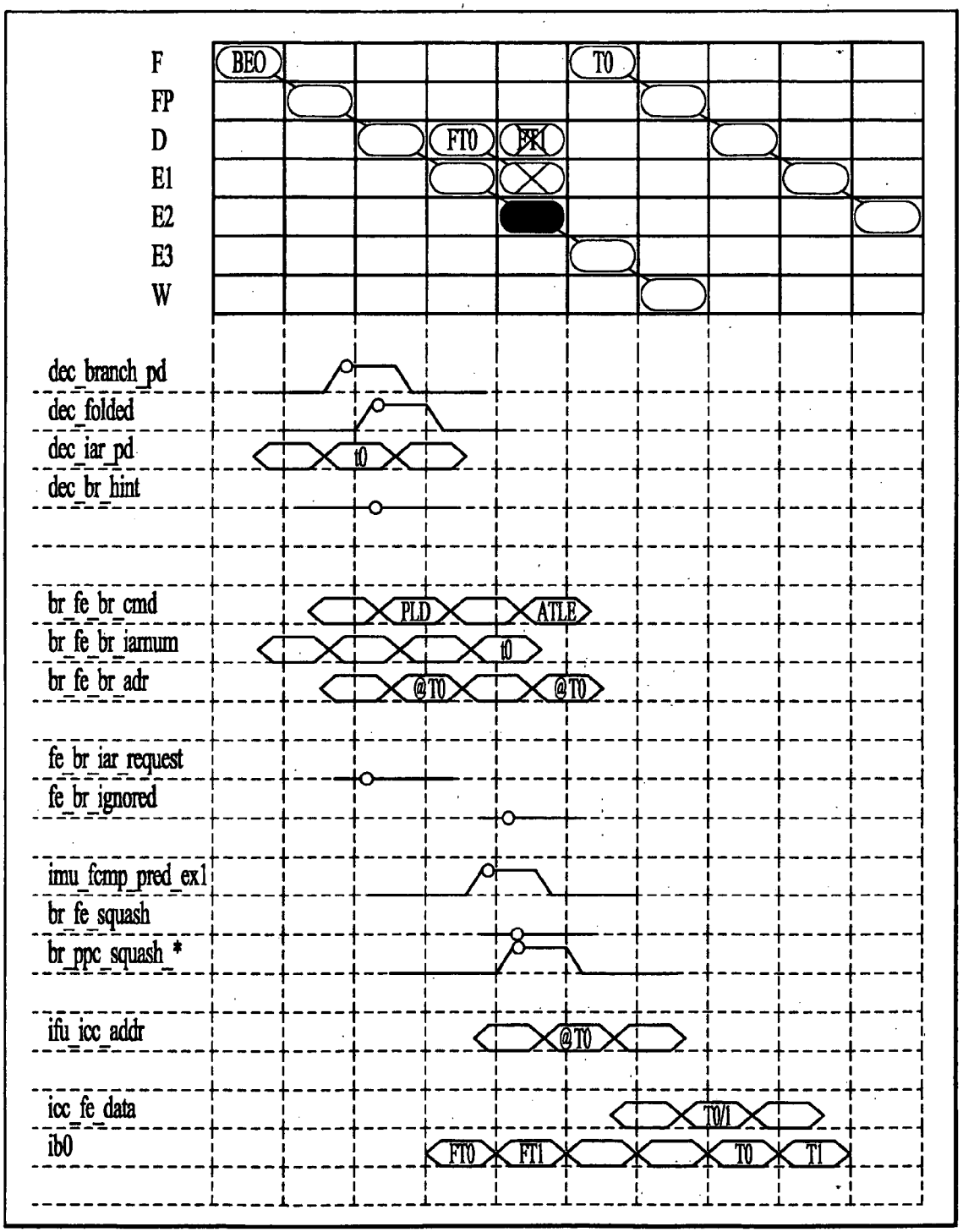
Figure 3G:
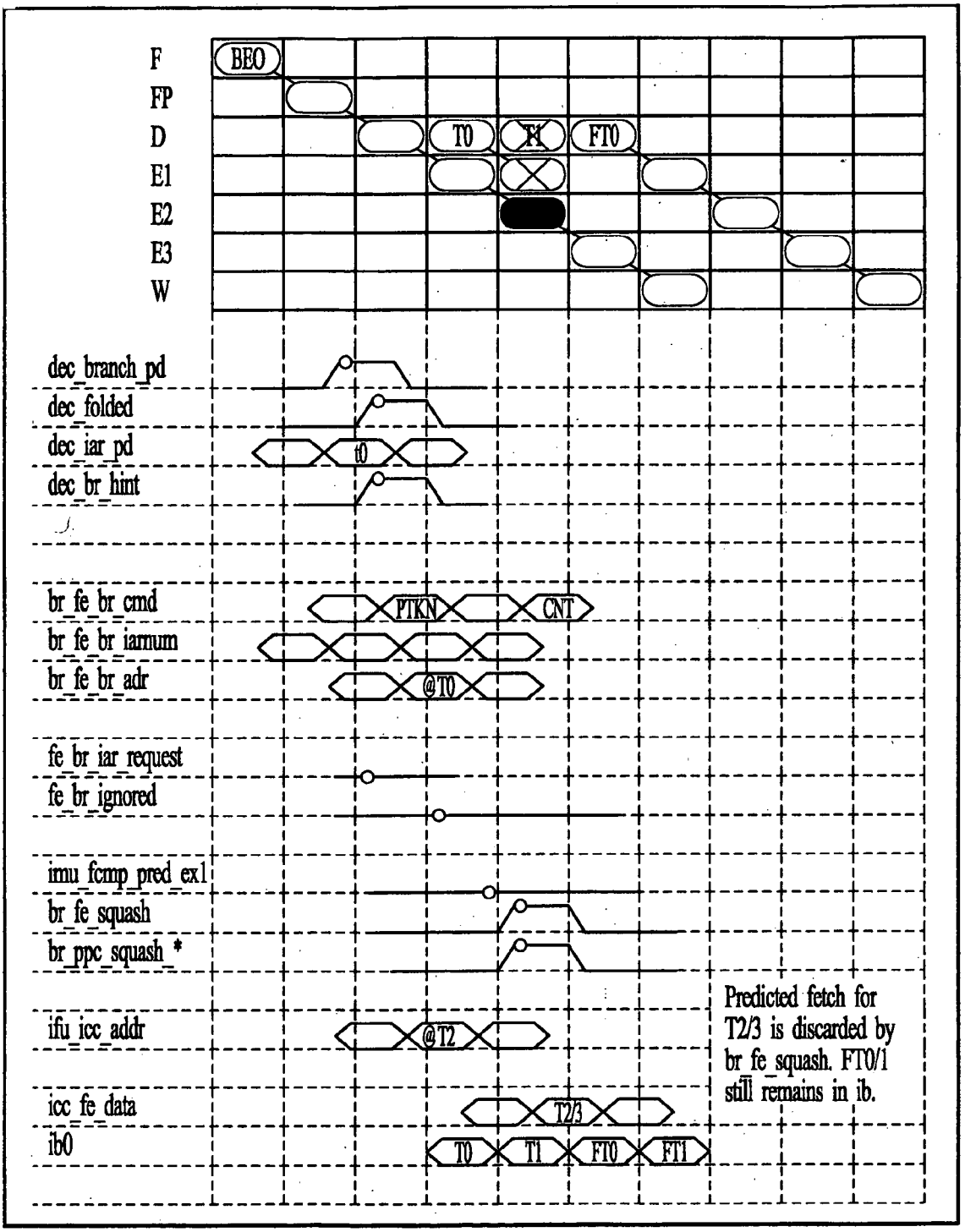
Figure 3H:
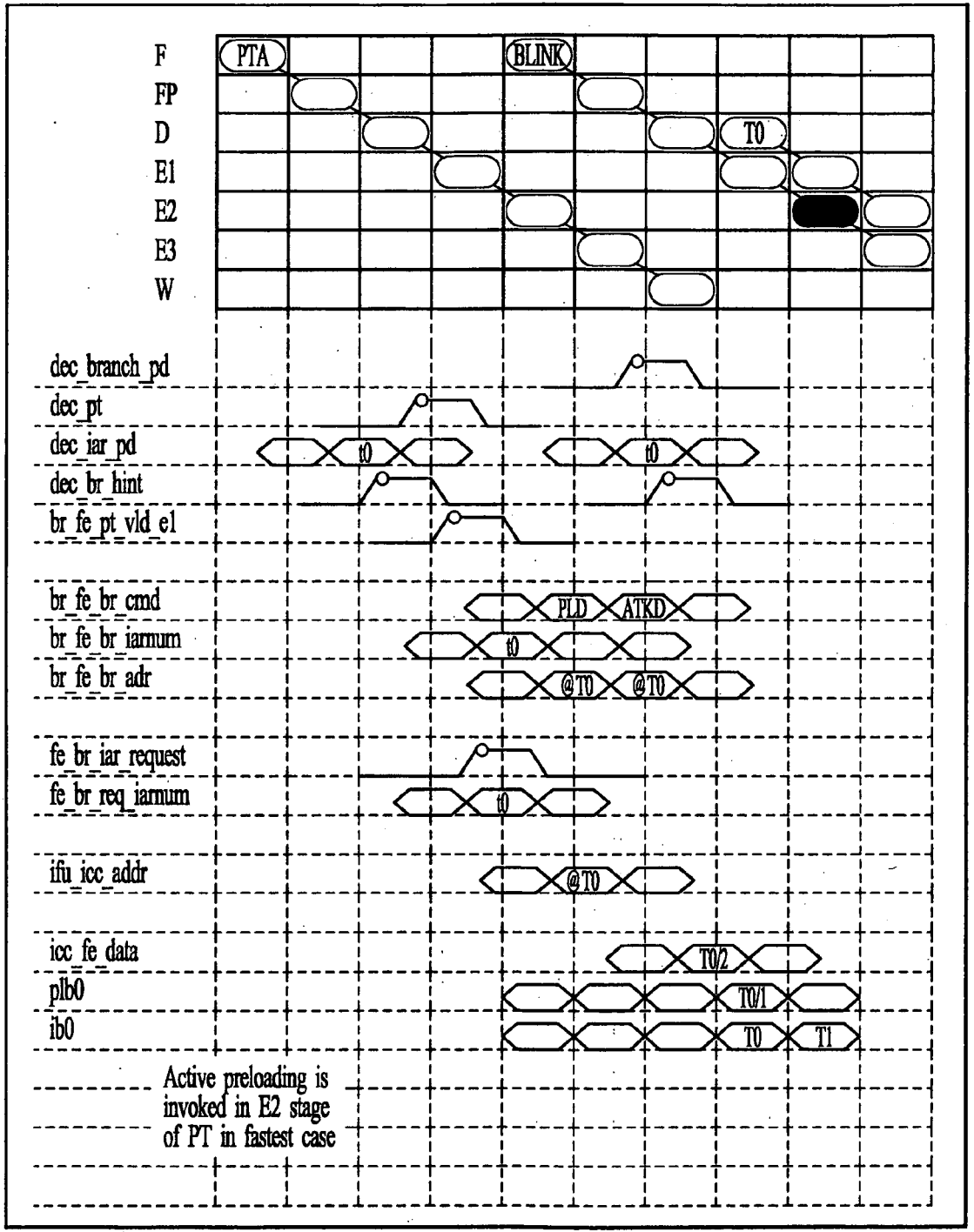

In addition, FIG. 3H depicts how an improved branch control (P") instruction is handled by computing system 100. When an unconditional branch instruction (denoted blink in the figure) follows such instruction in the pipeline, the necessary target address for it has already been computed (at stage E1 by the PT instruction) and is thus usable to load a target address instruction (T0) during the execution stage (E1) of the branch instruction.

From a careful review of the teachings herein, those skilled in the art will appreciate that some of the advantages of the above inventions include:

(1) even if a branch is only executed once, a hit can be made to a target instruction in IART 115.

(2) IART 115 does not have to be very large, because the compiler can analyze the entire program, and then optimize the usage of the available entries in such buffer; this saves space and power consumption for a processor 100 employing such structure.

(3) The target instruction entries in IART 115 can be accessed by the instruction address register (IAR) number supplied directly by the branch control instruction so delays are minimized/avoided.

(4) The fetch latency typically associated with retrieving cache entries (2 instructions) based on a decoded branch instruction (normally two cycles) is substantially eliminated in many cases by the inventive preloading process, since each preloaded entry can provide two instructions (thus saving two cycles).

(5) At most only three instructions need to be placed in the program between a branch control (PT) instruction and a branch instruction to make the above process extremely effective. This results from the fact that, after the PT instruction is decoded, the target address is available at the E2 stage of the PT instruction's execution, and thus the branch instruction which needs such target should optimally not be in the D stage yet (i.e., more than 2 stages/instructions behind). This figure, of course, will vary from pipeline to pipeline based on the particular architecture of the same.

(6) Two types of preloading are used, active and passive. This approach improves the chances that appropriate target instructions will be loaded in time to be executed.

Improved Branch Control/Branch Instruction

The microarchitecture described above is specifically designed to coordinate branch handlings using a separated format, whereby a branch control instruction sets up a pipeline in advance so that a later branch instruction can be quickly and efficiently executed. The following portions of the disclosure are directed more particularly to a preferred embodiment of a structure for a branch control instruction and an associated branch instruction. These embodiments are depicted generally in FIGS. 4A and 4B respectively.

As an initial clarification point, the branch control (PT) instruction is described herein as an entirely separate instruction from the actual branch instruction. While this instruction serves a number of purposes, one of the primary functions, from a simplified perspective, is to alert computing system that it should "prepare to branch" sometime soon in the instruction stream. Thus, while it performs some functions that are not commonly associated with a conventional branch instruction, it can, nonetheless, from an operational/functional perspective, be considered a logical component of the actual branch instruction, since the two are always logically and operationally linked. Furthermore, while the present disclosure discusses both instructions in order to better explain the present inventions, it should be understood that, in any particular application of the present invention, it is conceivable that the two would be implemented in integrated form, and in a manner that is transparent to the programmer. For instance, when designing programs for a computing system utilizing the present inventions, it is possible that only an integrated branch instruction would be visible to a software program developer/writer. Such developers may or may not be exposed or provided with explicit tools to implement the branch control instruction by itself in a high level format. Instead, after writing the entire program code in a high level language instruction set, including with conditional loop portions, a compiler would translate these high level language instructions into suitable branch control/branch pairs in a format most appropriate and optimal for execution within the particular computing system 100. The compiler would also glean the necessary target instruction address calculations, and target instructions, so that IART 115 can be pre-loaded effectively to handle branch operations within the particular program code.

With reference to FIG. 4A, examining the particular format of branch control (PT) instruction 410, therefore, it can be seen to include the following fields:

(1) Opcode (6 bits): this field is used during the pre-decoding process to identify the instruction uniquely to computing system 100

(2) Rm/edisp (6 bits): this field is used to specify either one of the registers in GPR 135 or as an extension field using for PC relative branchs as noted below and can be considered a target address base parameter which implicates either a relative or absolute base for the offset;

(3) Disp (13 bits): indicates the offset from the PC for a PC-relative branch, and can be concatenated with edisp (6 bits) to create a 19 bit displacement (4) L (1 bit): the likely bit (prediction bit) for the PT instruction, indicating the likelihood that the target instruction might be needed by at least one branch; note that this parameter involves slightly different and more complex evaluations than a conventional prediction bit, as explained in further detail below, since it takes into account the cumulative expectations for a number of branch operations (5) R (1 bit): indicates whether the target calculation implicates a register or the PC (6) IAR (3 bits): specifies which of the eight (8) IAR.A registers will be loaded with the target address after it is computed (7) Res: (2 bits): these are left as reserved for future functions.

While this embodiment is especially suitable for use in computing system 100 as defined above, it should be apparent that many other variations are possible depending on particular design choices, system architectures, etc., and that such variations are intended to be within the scope of the present teachings. Some additional characteristics of branch control (PT) instruction further improve flexibility and efficient utilization of the branch control logic used in computing system 100. Since the target address is calculated in advance, exception checks can be made before it is actually stored in one of the IARs in IAR.A 140. The target address can be checked to ensure it is within the implemented part of the address space, otherwise an exception can be raised. The target address can be checked to ensure that it is appropriately aligned for the target instruction, otherwise an exception can be raised. Other applications may require additional types of exceptions to b be checked as well.

These exceptions allow software errors to be caught early in the instruction stream and this can simplify debugging. Additionally, the detection of these exception cases in advance ensures that only valid instruction addresses are placed into the IARs. This can reduce the amount of storage in the IAR since, for example, there is no need to store address bits corresponding to unimplemented address space nor any need to indicate that a value held in the IAR is faulty. Additionally, this arrangement simplifies the implementation since there is no need for subsequent prefetch or branch mechanisms to implement logic for considering the case of the IAR value being faulty. Furthermore, because of the size of the target address base parameters and the displacement fields discussed above, the available control fields in the branch instruction can be better utilized (since an address calculation is not needed). In the present embodiment, at least four different types of PT instructions can be supported:

| | |
|---|---|
| PTA offset, target | Prepares a target address relative to the PC by adding a constant based on the displacement field to the PC |
| PTB offset, target | Same as above, except a different constant is used so that this instruction can be used to branch to a Mode B target instruction |
| PTABS address, register | Prepares a target address by using the value stored in the specified IAR |
| PTREL offset, target | Prepares a target address by adding a value stored in one of the specified IARs to the PC |

Other types will be apparent to those in the art, and can be easily implemented based on the availability and variety of coding fields used for PT instruction 410. In addition, as noted above, the branch control (PT) instruction can also include its own separate prediction bit; this parameter actually takes into account information quite distinct from that considered for a the branch instruction of the present invention discussed further below. The implications of this are quite significant, in that this adds a separate level of prediction that is believed to be unlike that in the prior art. This is due to the fact that, as seen above, the PT hint bit is typically used to speculatively predict/execute pre-fetch operations within computing system 100, and takes into account the cumulative probability of a number of potential branch operations that may require a particular branch target instruction. This is quite different from the branch prediction hint, as the latter is only used to distinguish the later flow of the instruction stream (taken or not taken). In determining the PT hint bit, a number of competing considerations can be taken into account. For instance, as will be explained below, it is possible that multiple branch instructions will be associated with a single PT instruction. Thus, the PT hint bit must factor the possibility that any one of these potential branches may implicate or require the target instruction. From a high level perspective, therefore, the PT hint essentially predicts whether a particular target instruction is likely to be needed in IART 115. In the applicant's experience, this cumulative accounting of branch probabilities provides a more accurate target instruction prediction process, and ensures that more appropriate instructions are loaded in advance and ready for execution when they are needed. For example, if it is determined, from compiler analysis, that three separate branches are to use the same target address, and that each of them has an approximately 40% (3 out of 5) chance of being taken, it is possible that the branch hint bit would not be set to taken for any of these branches. However, in the aggregate, it can be seen that the chances of at least one of them using the target address is 98/125, or almost 80%. Accordingly, from a performance perspective, it is highly advantageous to pre-load IART 115 with the target instruction since it is very likely it will be used at some time during program execution, and many penalty cycles can be avoided by doing so.

A typical example of placement of the use of PT instructions in a conventional program is shown in FIG. 4B, where two PT instructions are placed in front of two distinct loops (BEGIN_LOOP and INC). For the reasons set out above, these instructions are hoisted (placed) before their counterpart branch instructions. The most substantial gains are realized when PT instructions are hoisted out of inner loops, as seen in FIG. 4B. Preferably, these branch control instructions are arranged so that there is maximum separation in the dynamic instruction stream from the branch instruction that reads the target address register. Again, this gives the branch mechanism the maximum amount of time to arrange for the flow of instructions to be changed or maintained without penalties. The placement of these instructions can be highly optimized using standard compiler techniques such as loop/block-invariant code motion, common sub-expression elimination, register allocation and instruction scheduling. Where more than PT instruction from more than one branch refers to the same target instruction, the PT instructions can be merged; and, as indicated above, the PT hint bit can be adjusted in accordance with an evaluation of the prediction scenario for the multiple branches to better reflect expected instruction flow conditions. From a practical perspective, the only limits on this optimization are based on the particular environment constraints, such as the size of the functions called, the number of address registers used, and any data/control dependencies in the program.

Examining now the particular format of an improved branch instruction 420 in FIG. 4B, therefore, it can be seen to include the following fields:
 (1) Opcode (6 bits): this field is used during the pre-decoding process to identify the instruction uniquely to computing system 100
 (2) Rm/Pm (6 bits): this field is used to specify one of the registers in GPR 135, or a register predicate (i.e., a logical condition such as true/false);
 (3) Rn/Pn (6 bits): this field is used to specify another one of the registers in GPR 135 (or a second register predicate;
 (4) Res/imm (5 bits): these are reserved
 (5) L (1 bit): the prediction bit for the PT instruction;
 (6) IAR (3 bits): specifies which of the IAR.A registers will be loaded with the target address after it is computed
 (7) Extension (3 bits) specifies the logical operation conditioning the branch operation, or the logical type of branch, i.e., BEQ, BGE, JMP, BSR, etc.; note that these operations can be based on even an arithmetic or predicate condition of two separate registers, as noted above
 (8) Res: (2 bits): these are left as reserved for future functions.

As for PT instruction 410, while this embodiment is especially suitable for use in computing system 100 as defined above, it should be apparent that many other variations are possible depending on particular design choices, system architectures, etc., and that such variations are intended to be within the scope of the present teachings.

Some additional characteristics of branch instruction 420 further improve flexibility and efficient utilization of the branch control logic used in computing system 100. First, since the target address is calculated in advance, the now-available parameter fields can be used to effectuate an operation that can be described generaly as "compare-fold." By this it is meant that a compare instruction commonly used in programs can now be folded (merged) into the branch instruction itself. This, of course, saves significant time by eliminating an entire instruction, and can reduce overall code size considerably. The Rm and Rn fields are used as operands (source1, source2) by the type of branch specified in the branch extension field to implement one of many different types of branch instructions, including:

| | |
|---|---|
| BEQ source1, source2, target | Branch if equal (64 bit compare) |
| BNE source 1, source1, target | Branch if not equal (64 bit compare) |

-continued

| | |
|---|---|
| BGT source1 source1, target | Branch if greater (64 bit signed) |
| BGE source1, source2, target | Branch if greater than or equal (64 bit signed) |
| BGTU source1, source2, target | Branch if greater than (64 bit unsigned) |
| BGEU source1, source2, target | Branch if greater than or equal (64 bit unsigned) |

As seen above, the extra space available in the branch instruction 420 is put to beneficial use, including the ability to code register to use general purpose register comparison operations during a branch evaluation. This is generally not possible in the prior art, because the register specifications require at least 5 bits (for each of Rm, Rn) to make the procedure useful, and this is not available in a conventional branch instruction. Furthermore, because of the additional opcode space availalable, conditional branches can be coded and executed in some applications based on operand (or register) predicate evaluations. In other words, a branch might be taken only if both predicates (Pm, Pn) (which can be register values) were evaluated logically true (or false), or if one or the other had a true condition, etc. Additional methods for constructing additional types of branch instructions that evaluate multiple predicate operands as part of a compare operation will be apparent to those skilled in the art from the present teachings.

Many branch operations require a comparison of a branch parameter with zero. If register 63 is permanently assigned to have a zero value, such operations can be replaced by a single branch instruction with R63 set as one of the operands. This simplifies the formatting of the instructions significantly, and improves execution speed. Other types of branch instructions will be apparent to those in the art, and can be easily implemented based on the availability and variety of coding fields used for PT instruction 410. For example, additional conditional branch instructions that can be implemented in the present invention include those that compare register values with a constant that is not specified in a register.

If the branch condition is met, based on the logical operation employing the register operands, the branch target is fetched using the contents specified by IAR. To further reduce the microarchitecture potential branch penalties, conditional branch instructions of the present invention are arranged in sequences throughout the code so that they favor fall-through (i.e., non-redirect of instruction flow) to avoid branch penalties.

As explained in detail above, a conditional branch instruction 420 includes a prediction bit (L). This bit helps computing system 100 determine whether it should begin execution of the predicted path, even before the branch condition is resolved. Various well-known techniques can be used for setting this bit, based on analyzing standard compiler heuristics, or branch profile information.

Furthermore, as noted earlier, one or more target instructions can be pre-loaded into IART 115 in advance of execution of the program, to enhance branch speed, and improve overall program performance. This can be done by various techniques, including by code scanning (to identify branch instructions) or by explicit register loading through a configuration instruction that can identify and store branch target addresses, target instructions, etc. directly in IAR.T 115 and/or IAR.A 140 prior to executing some portion of the program, such as a loop. In other words, prior to the occurrence of even a PT instruction, a configuration instruction may be executed which sets up the architecture of computing machine 100 (including with prospective branch target addresses) so as to be primed for execution of one or more code portions. The determination of which branch addresses/instructions to load can be based on any number of considerations by a skilled program designer, and because of varying system characteristics, it is expected that the precise methodology will vary from application to application.

Figure 4D:
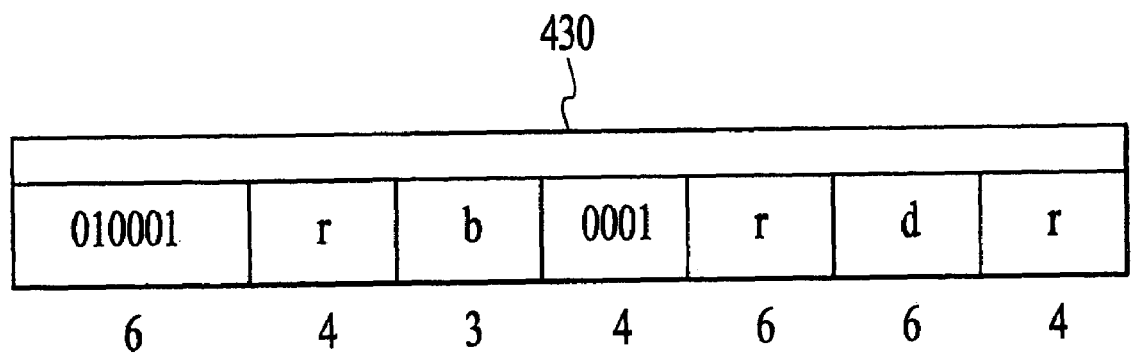
FIG. 4D depicts a preferred embodiment of an unconditional branch instruction of the present invention.

An unconditional branch instruction 430 has a slightly different format, as seen in FIG. 4D, and can be considered as a branch and link (BLINK) instruction having a format BLINK Target, Link. In this instruction, the fields are defined as follows:

(1) Opcode (6 bits): this field is used during the pre-decoding process to identify the instruction uniquely to computing system 100
(2) r (4 bits), 7 bits and 4 bits: these fields are reserved
(3) b (3 bits): this field specifies one of the target address (IAR) registers as the source of the target address
(4) d (6 bits): this field is used to specify one of the registers in GPR 135 to be used as the address of the instruction following the branch.

The above format is preferable over a conditional branch that is always true, since decoding can be done much more quickly. BLINK writes the target address of the subsequent instruction to a destination register Rd in GPR 135. Since it allows the target instruction sequence to return control back to the instruction sequence that invoked it, this can be considered a linking mechanism. Thus, it can be used to implement standard call and return mechanisms.

To implement an unconditional branch instruction 430 without a link, a special register can be dedicated in GPR 135, so that a branch instruction formatted as: BLINK Target, R63 will transfer control the target without writing to a destination register.

Again, it should be understood from the present disclosure that many different types of variations and combinations of the branch control/branch instructions are possible. In fact, in a different processor using a different pipeline configuration, it is likely that the structure/format of such instructions would need to be adjusted slightly to best fit the particular microarchitecture employed. Nonetheless, if such applications utilize the principles and features discussed above, it is expected that they will also benefit significantly from a branch operation performance perspective.

Additional Operation Modes for Different Instruction Sets

Another aspect of the present invention relates to the fact that computing system 100 may, in some instances, be used to support two separate instruction sets, which, for ease of illustration, can be thought of as Set A and Set B. In such cases, the processor executes in two separate modes of operation (i.e, Mode A and Mode B). The use of more than one instruction set is helpful in some applications to support programming optimizations (i.e., such as in cases where it is determined that program performance is substantially superior in one mode or the other) or where it might be desirable to support legacy software (i.e., programs containing only more primitive instructions).

In the present preferred embodiment, computing system 100 is optimized to execute Mode A instructions, which, as noted below, are 32 bit instructions, but, for the above reasons, it is also capable of supporting instruction Set B as well, which consists of 16 bit instructions. The Mode A operation is optimized from the perspective that the overall architecture, timing, bus protocols, data paths, specific circuit implementations, etc., are built around supporting the instructions in Set A. To execute the Set B instructions, it is preferable to emulate them using the other Set A instructions, so that hardware and programming complexity are reduced.

When an instruction comes into the pipeline, and is stored in IB 110, for example, the present computing system 100 makes no distinction concerning its status as an instruction from set A or set B. This differentiation is made, for example, by Decoder 125 during a decoding or pre-decoding operation. When an instruction from set B is encountered, it can be directed to separate pipeline stage (not shown) and converted (using any of a number of conventional techniques) to one or more set A instructions. These set A replacement instructions are then inserted into the appropriate stage of the pipeline for execution in the normal manner as any other set A instructions.

It is conceivable, nonetheless, that the two instruction sets will not have the same branch instruction format, or branch control handling. In such cases, it is preferred nonetheless that at least the Mode A operation of the computing system 100 should use a separated branch process as described above; i.e., a branch instruction coupled with a branch control instruction presented earlier in the program flow that is used to calculate a target address in advance, set up buffers and logic within system 100, and also includes a folded branch condition/direction format for the branch instruction itself (as seen in FIG. 3B).

In comparison, instruction set B does not use a separate branch control instruction for computing the target address, and uses a separate compare instruction to resolve the branch condition. Furthermore, a branching process used in this Mode B operation adds a delayed branch instruction that results in executing the instruction following the branch unconditionally.

Consistent with the emulation approach noted above, the present invention thus emulates a mode B branch instruction by a mode A branch control (PT) instruction, followed by a mode A branch instruction. In this case, since a back-to-back PT and branch instruction will result in a pipeline bubble, there is inevitably a 1 cycle penalty for mode B branches. Since support for mode B support operation is not expected to be great in most applications, this is in fact a very acceptable result in practice. Because of the extra pipeline stage required to decode mode B instructions as well, it is possible that additional bubbles can arise. To simplify processing of mode B instructions, it is also preferable that no branch prediction be performed. In other words, all conditional branches are predicted as not-taken. This is a consequence of the fact that the branch control instruction in this instance is generated by DEC 125 (and not by compiler/software determinations), and therefore the associated hint bit cannot be generated reliably. It is conceivable, however, that the hint bit could be adjusted by additional monitoring logic (not shown) in some environments (based on the path taken by the branch instruction) to similarly imitate the behavior of the compiler determinations made for the mode A instruction based programs.

To support mode B delayed branch instructions, the fall-through instruction in Mode A is executed unconditionally. For branches that are actually taken, BRCTL 150 holds on to the branch target address until FECTL 101 can accept it for initiating a new instruction fetch. This is because a mode B delay-slot instruction may be on a different cache line in IC 105, so it is not necessarily loaded in the correct time, location in IB 110. Normally, BRCTL 150 determines the branch direction, and then re-directs the fetch path without waiting. In the case of a delayed branch, however, if the delay slot instruction has missed the cache access, direction of the program flow cannot be changed until it has been fetched.

The above embodiments for implementing the inventions are provided merely by way of example, and are not intended to be limiting of the present invention in any respect. Other variations will become evident to those skilled in the art based on the teachings herein. Accordingly, it is intended that the all such alterations and modifications be included within the scope and spirit of the invention as defined by the following claims.

What is claimed is:

1. A branch control memory for assisting in prefetching operations between an instruction cache, a branch target instruction buffer and a branch target address buffer used in a processor, the branch control memory comprising:
   a first buffer having a first field for identifying whether a target instruction within the branch target instruction buffer is valid;
   a second buffer having a second field for identifying whether a branch target address within the branch target address buffer can be used for preloading a branch target instruction;
   a third buffer having a third field for identifying whether said branch target address within said branch target address buffer is likely to be used by a branch instruction executed by the processor;
   wherein in response to an evaluation by the processor of whether a branch target instruction in said branch target instruction buffer is valid, whether said branch target address is likely to be used, and whether said branch target address can be used for preloading, the processor pre-loads one or more instructions from the instruction cache into the branch target instruction buffer, said one or more instructions having addresses associated with said branch target address.

2. The branch control memory of claim 1, wherein the processor is configured to periodically monitor said first buffer to locate invalid instructions in said target instruction memory, and if no higher priority access exists, the processor is adapted to fetch instructions from the instruction cache and load them into said branch target instruction buffer.

3. The branch control memory of claim 1, wherein said second buffer contains a number of registers for storing distinct branch target addresses, each of said registers being identified by a register number, and further wherein the processor prioritizes by register number how said registers are used for preloading instructions.

4. The branch control memory of claim 1, wherein if a branch target address is used to pre-load one or more instructions into the branch target instruction buffer, said second field is changed to indicate that said branch target address is not available for preloading.

5. The branch control memory of claim 1, wherein the processor does not pre-load instructions for a branch address if said third field indicates that the branch target address is not likely to be used.

6. The branch control memory of claim 1, wherein the processor also performs pre-loading during times when branch instructions are not being executed, so that target instructions for such branch instructions can be loaded before such branch instructions are loaded.

7. A method of operating a branch control memory for assisting in prefetching operations between an instruction cache, a branch target instruction buffer and a branch target address buffer used in a processor, the method comprising the steps of:

identifying whether a target instruction within the branch target instruction buffer is valid;

identifying whether a branch target address within the branch target address buffer can be used for preloading a branch target instruction;

identifying whether said branch target address within the branch target address buffer is likely to be used by a branch instruction executed by the processor;

pre-loading one or more instructions from the instruction cache into the branch target instruction buffer, said one or more instructions having addresses associated with said branch target address, when the processor determines:

(i) that a branch target instruction in said branch target instruction buffer is valid;
(ii) that a branch target address is likely to be used;
(iii) that said branch target address can be used for preloading.

* * * * *